(12) United States Patent
Dutta et al.

(10) Patent No.: US 12,069,755 B2
(45) Date of Patent: Aug. 20, 2024

(54) TECHNIQUES FOR ASSISTED SIDELINK BEARER ESTABLISHMENT

(71) Applicant: QUALCOMM Incorporated, San Diego, CA (US)

(72) Inventors: Sourjya Dutta, San Diego, CA (US);
Kapil Gulati, Belle Mead, NJ (US);
Shuanshuan Wu, San Diego, CA (US);
Junyi Li, Fairless Hills, PA (US);
Navid Abedini, Basking Ridge, NJ (US); Anantharaman Balasubramanian, San Diego, CA (US); Preeti Kumari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 295 days.

(21) Appl. No.: 17/501,816

(22) Filed: Oct. 14, 2021

(65) Prior Publication Data
US 2023/0122731 A1    Apr. 20, 2023

(51) Int. Cl.
*H04W 4/00* (2018.01)
*H04W 72/51* (2023.01)
*H04W 76/14* (2018.01)

(52) U.S. Cl.
CPC ........... *H04W 76/14* (2018.02); *H04W 72/51* (2023.01)

(58) Field of Classification Search
CPC ..... H04W 76/14; H04W 72/04; H04W 72/23; H04W 72/40; H04W 72/51; H04W 72/048; H04W 8/005; H04W 8/22; H04W 84/18; H04W 84/047; H04W 88/04; H04W 92/18; H04B 7/0695–0697; H04B 7/088

See application file for complete search history.

(56) References Cited

U.S. PATENT DOCUMENTS

| | | | |
|---|---|---|---|
| 2012/0135677 A1* | 5/2012 | Hsu | H04B 7/15507 455/11.1 |
| 2021/0075474 A1* | 3/2021 | Raghavan | H04B 7/0417 |
| 2022/0069884 A1* | 3/2022 | Zhang | H04B 7/088 |
| 2022/0369346 A1* | 11/2022 | Xu | H04W 4/40 |
| 2022/0386319 A1* | 12/2022 | Ying | H04B 7/0695 |
| 2023/0171755 A1* | 6/2023 | Dutta | H04W 76/14 370/329 |

(Continued)

*Primary Examiner* — Edan Orgad
*Assistant Examiner* — Hidayat Dabiri
(74) *Attorney, Agent, or Firm* — Holland & Hart LLP

(57) ABSTRACT

Methods, systems, and devices for wireless communications are described. A first user equipment (UE) may transmit a request for a base station to establish a wireless communication link between the first UE and a second UE via an assisting device (AD) associated with an assisting node (AN). The first UE may receive first control signaling from the base station including an indication for the first UE to perform a directional learning procedure with the AN in response to the request, and may transmit an uplink message including an indication of a completion of the directional learning procedure. The first UE may receive second control signaling from the base station indicating a set of resources for performing a link configuration procedure between the first UE and the second UE, and may communicate with the second UE via the AD of the AN based on the second control signaling.

30 Claims, 17 Drawing Sheets

(56) References Cited

U.S. PATENT DOCUMENTS

| | | | |
|---|---|---|---|
| 2023/0171826 A1* | 6/2023 | Selvanesan | H04W 76/14 370/310 |
| 2023/0224987 A1* | 7/2023 | Kim | H04W 92/18 370/315 |
| 2023/0300710 A1* | 9/2023 | Cao | H04W 4/06 370/312 |

* cited by examiner

TECHNIQUES FOR ASSISTED SIDELINK BEARER ESTABLISHMENT

FIELD OF TECHNOLOGY

The following relates to wireless communications, including techniques for assisted sidelink bearer establishment.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may utilize assisting nodes (ANs) to facilitate wireless communications between wireless devices. ANs may be used to relay, forward, reflect, and amplify signals transmitted from one wireless device to another wireless device. For example, an AN may relay sidelink communications received from a first UE to another UE. The use of ANs may increase a power and/or reliability of wireless communications, and may extend a range over which wireless devices may communicate. However, some conventional techniques for establishing wireless connections via ANs are deficient.

SUMMARY

The described techniques relate to improved methods, systems, devices, and apparatuses that support techniques for assisted sidelink bearer establishment. Generally, aspects of the present disclosure provide techniques which enable base stations to assist with establishing wireless links via assisting devices (ADs) controlled by assisting nodes (ANs). For example, a first user equipment (UE) may transmit a request for a base station to facilitate establishment of a link with a second UE via one or more ADs associated with an AN (e.g., AN discovery request). In some cases, the first UE may transmit the request after being unable to establish a direct link with the second UE. The request may include information associated with the second UE and/or surrounding ANs (e.g., positions of AN/second UE). Subsequently, the base station may instruct one or more ANs to perform a directional learning procedure with the first and second UEs. The respective UEs and ANs may transmit reports (e.g., measurement reports) associated with the respective directional learning procedures, which may enable the base station to select which AN should be used to facilitate communications between the first and second UEs based on the received reports. The base station may then instruct the UEs and selected AN to perform a link configuration procedure to identify which link configuration of the one or more ADs of the AN which should be used to facilitate communications between the respective UEs.

A method for wireless communication at a first UE is described. The method may include transmitting, to a base station, a request for the base station to establish a wireless communication link between the first UE and a second UE via at least one AD associated with at least one AN, receiving, from the base station in response to the request, first control signaling including an indication for the first UE to perform a directional learning procedure with an AN, transmitting, to the base station and based on the first control signaling, an uplink message including an indication of a completion of the directional learning procedure performed with the AN, receiving, from the base station in response to the uplink message, second control signaling indicating a set of resources for performing a link configuration procedure between the first UE and the second UE, and communicating with the second UE via one or more ADs of the AN based on the second control signaling.

An apparatus for wireless communication at a first UE is described. The apparatus may include a processor, memory coupled with the processor, and instructions stored in the memory. The instructions may be executable by the processor to cause the apparatus to transmit, to a base station, a request for the base station to establish a wireless communication link between the first UE and a second UE via at least one AD associated with at least one AN, receive, from the base station in response to the request, first control signaling including an indication for the first UE to perform a directional learning procedure with an AN, transmit, to the base station and based on the first control signaling, an uplink message including an indication of a completion of the directional learning procedure performed with the AN, receive, from the base station in response to the uplink message, second control signaling indicating a set of resources for performing a link configuration procedure between the first UE and the second UE, and communicate with the second UE via one or more ADs of the AN based on the second control signaling.

Another apparatus for wireless communication at a first UE is described. The apparatus may include means for transmitting, to a base station, a request for the base station to establish a wireless communication link between the first UE and a second UE via at least one AD associated with at least one AN, means for receiving, from the base station in response to the request, first control signaling including an indication for the first UE to perform a directional learning procedure with an AN, means for transmitting, to the base station and based on the first control signaling, an uplink message including an indication of a completion of the directional learning procedure performed with the AN, means for receiving, from the base station in response to the uplink message, second control signaling indicating a set of resources for performing a link configuration procedure between the first UE and the second UE, and means for communicating with the second UE via one or more ADs of the AN based on the second control signaling.

A non-transitory computer-readable medium storing code for wireless communication at a first UE is described. The code may include instructions executable by a processor to transmit, to a base station, a request for the base station to establish a wireless communication link between the first UE and a second UE via at least one AD associated with at least one AN, receive, from the base station in response to the request, first control signaling including an indication for the first UE to perform a directional learning procedure with an AN, transmit, to the base station and based on the first control signaling, an uplink message including an indication of a completion of the directional learning procedure performed with the AN, receive, from the base station in response to the uplink message, second control signaling indicating a set of resources for performing a link configuration procedure between the first UE and the second UE, and communicate with the second UE via one or more ADs of the AN based on the second control signaling.

Some examples of the method, apparatuses, and non-transitory computer-readable medium described herein may further include operations, features, means, or instructions for transmitting, via the request, an indication of one or more parameters associated with the second UE, where receiving the first control signaling may be based on the indication of the one or more parameters.

In some examples of the method, apparatuses, and non-transitory computer-readable medium described herein, the one or more parameters include a destination identifier associated with the second UE, a peer layer 2 (L2) identifier associated with the second UE, a geographical location of the second UE, a sidelink zone identifier associated with the second UE, a cell identifier associated with the second UE, a type of communication service to be established with the second UE, or any combination thereof.

Some examples of the method, apparatuses, and non-transitory computer-readable medium described herein may further include operations, features, means, or instructions for identifying one or more ANs which may be within a range of the first UE, and transmitting, via the request, an indication of the one or more identified ANs, where receiving the first control signaling may be based on transmitting the indication of the one or more identified ANs.

Some examples of the method, apparatuses, and non-transitory computer-readable medium described herein may further include operations, features, means, or instructions for transmitting, via the request, information associated with each AN of the one or more identified ANs, where the information includes a distance between the first UE and each respective AN, a signal strength metric associated with signals received from each respective AN, a signal quality metric associated with signals received from each respective AN, or any combination thereof, where receiving the first control signaling may be based on the information associated with each AN.

Some examples of the method, apparatuses, and non-transitory computer-readable medium described herein may further include operations, features, means, or instructions for receiving, from the base station, an indication of a set of multiple transmission occasions associated with a periodicity, the set of multiple transmission occasions configured for communicating requests for the base station to establish wireless connections between wireless devices via ANs, where the request may be transmitted within a transmission occasion of the set of multiple transmission occasions.

Some examples of the method, apparatuses, and non-transitory computer-readable medium described herein may further include operations, features, means, or instructions for transmitting the request to the base station based on the first UE being unable to establish a sidelink communication link with the second UE.

Some examples of the method, apparatuses, and non-transitory computer-readable medium described herein may further include operations, features, means, or instructions for receiving, via the first control signaling, an indication of an additional set of resources for performing the directional learning procedure with the AN and performing directional learning communications with the AN within the additional set of resources to perform the directional learning procedure, where transmitting the uplink message may be based on the performance of the directional learning communications.

Some examples of the method, apparatuses, and non-transitory computer-readable medium described herein may further include operations, features, means, or instructions for receiving, via the first control signaling, an indication of a position of the AN, a direction of the AN relative to the first UE, or both and performing directional learning communications with the AN based on the position, the direction, or both, where transmitting the uplink message may be based on the performance of the directional learning communications.

Some examples of the method, apparatuses, and non-transitory computer-readable medium described herein may further include operations, features, means, or instructions for transmitting, via the uplink message, a measurement report associated with wireless communications between the first UE and the AN, a quasi co-location (QCL) associated with the AN, or both, where receiving the second control signaling may be based on the measurement report, the QCL, or both.

Some examples of the method, apparatuses, and non-transitory computer-readable medium described herein may further include operations, features, means, or instructions for communicating with the second UE via the one or more ADs of the AN within the set of resources for the link configuration procedure in accordance with a set of multiple link configurations associated with the one or more ADs of the AN, where communicating with the second UE via the one or more ADs of the AN includes communicating in accordance with a link configuration of the set of multiple link configurations.

Some examples of the method, apparatuses, and non-transitory computer-readable medium described herein may further include operations, features, means, or instructions for receiving, via the second control signaling, an indication of the set of multiple link configurations.

A method for wireless communication at a base station is described. The method may include receiving, from a first UE, a request for the base station to establish a wireless communication link between the first UE and a second UE via at least one AD associated with at least one AN, transmitting, to the first UE in response to the request, first control signaling including an indication for the first UE to perform a directional learning procedure with an AN, receiving, from the first UE, the AN, or both, and based on the first control signaling, an uplink message including an indication of a completion of the directional learning procedure performed with the AN, and transmitting, to the first UE, the AN, or both, and in response to the uplink message, second control signaling indicating a set of resources for performing a link configuration procedure between the first UE and the second UE.

An apparatus for wireless communication at a base station is described. The apparatus may include a processor, memory coupled with the processor, and instructions stored in the memory. The instructions may be executable by the processor to cause the apparatus to receive, from a first UE, a request for the base station to establish a wireless communication link between the first UE and a second UE via at least one AD associated with at least one AN, transmit, to the first UE in response to the request, first control signaling including an indication for the first UE to perform a directional learning procedure with an AN, receive, from the first UE, the AN, or both, and based on the first control signaling, an uplink message including an indication of a completion of the directional learning procedure performed with the AN, and transmit, to the first UE, the AN, or both, and in response to the uplink message, second control signaling indicating a set of resources for performing a link configuration procedure between the first UE and the second UE.

Another apparatus for wireless communication at a base station is described. The apparatus may include means for receiving, from a first UE, a request for the base station to establish a wireless communication link between the first UE and a second UE via at least one AD associated with at least one AN, means for transmitting, to the first UE in response to the request, first control signaling including an indication for the first UE to perform a directional learning procedure with an AN, means for receiving, from the first UE, the AN, or both, and based on the first control signaling, an uplink message including an indication of a completion of the directional learning procedure performed with the AN, and means for transmitting, to the first UE, the AN, or both, and in response to the uplink message, second control signaling indicating a set of resources for performing a link configuration procedure between the first UE and the second UE.

A non-transitory computer-readable medium storing code for wireless communication at a base station is described. The code may include instructions executable by a processor to receive, from a first UE, a request for the base station to establish a wireless communication link between the first UE and a second UE via at least one AD associated with at least one AN, transmit, to the first UE in response to the request, first control signaling including an indication for the first UE to perform a directional learning procedure with an AN, receive, from the first UE, the AN, or both, and based on the first control signaling, an uplink message including an indication of a completion of the directional learning procedure performed with the AN, and transmit, to the first UE, the AN, or both, and in response to the uplink message, second control signaling indicating a set of resources for performing a link configuration procedure between the first UE and the second UE.

Some examples of the method, apparatuses, and non-transitory computer-readable medium described herein may further include operations, features, means, or instructions for receiving, from the first UE, an additional AN, or both, and based on transmitting the first control signaling, an additional uplink message including an indication of a completion of an additional directional learning procedure performed between the first UE and the additional AN and selecting the AN for establishing the wireless communication link between the first UE and the second UE based on a comparison of the uplink message and the additional uplink message, where transmitting the second control signaling may be based on the selecting.

Some examples of the method, apparatuses, and non-transitory computer-readable medium described herein may further include operations, features, means, or instructions for receiving, via the request, an indication of one or more parameters associated with the second UE, where transmitting the first control signaling may be based on the indication of the one or more parameters.

In some examples of the method, apparatuses, and non-transitory computer-readable medium described herein, the one or more parameters include a destination identifier associated with the second UE, a peer L2 identifier associated with the second UE, a geographical location of the second UE, a sidelink zone identifier associated with the second UE, a cell identifier associated with the second UE, a type of communication service to be established with the second UE, or any combination thereof.

Some examples of the method, apparatuses, and non-transitory computer-readable medium described herein may further include operations, features, means, or instructions for receiving, via the request, an indication of one or more ANs which may be within a range of the first UE, where transmitting the first control signaling may be based on receiving the indication of the one or more identified ANs.

Some examples of the method, apparatuses, and non-transitory computer-readable medium described herein may further include operations, features, means, or instructions for receiving, via the request, information associated with each AN of the one or more identified ANs, where the information includes a distance between the first UE and each respective AN, a signal strength metric associated with signals received from each respective AN, a signal quality metric associated with signals received from each respective AN, or any combination thereof, where transmitting the first control signaling may be based on the information associated with each AN.

Some examples of the method, apparatuses, and non-transitory computer-readable medium described herein may further include operations, features, means, or instructions for transmitting, to the first UE, an indication of a set of multiple transmission occasions associated with a periodicity, the set of multiple transmission occasions configured for communicating requests for the base station to establish wireless connections between wireless devices via ANs, where the request may be received within a transmission occasion of the set of multiple transmission occasions.

Some examples of the method, apparatuses, and non-transitory computer-readable medium described herein may further include operations, features, means, or instructions for receiving the request from the first UE based on the first UE being unable to establish a sidelink communication link with the second UE.

Some examples of the method, apparatuses, and non-transitory computer-readable medium described herein may further include operations, features, means, or instructions for transmitting, via the first control signaling, an indication of an additional set of resources for performing the directional learning procedure with the AN, where receiving the uplink message may be based on the indication of the additional set of resources.

Some examples of the method, apparatuses, and non-transitory computer-readable medium described herein may further include operations, features, means, or instructions for transmitting, via the first control signaling, an indication of a position of the AN, a direction of the AN relative to the first UE, or both, where receiving the uplink message may be based on the indication of the position, the direction, or both.

Some examples of the method, apparatuses, and non-transitory computer-readable medium described herein may further include operations, features, means, or instructions for receiving, via the uplink message, a measurement report associated with wireless communications between the first UE and the AN, a QCL associated with the AN, or both, where transmitting the second control signaling may be based on the measurement report, the QCL, or both.

A method for wireless communication at an AN is described. The method may include receiving, from the base station in response to a request for the base station to establish a wireless communication link between a first UE and a second UE via one or more ADs of the AN, first control signaling including an indication for the AN to perform a directional learning procedure with the first UE, transmitting, to the base station and based on the first control signaling, an uplink message including an indication of a completion of the directional learning procedure performed with the first UE, receiving, from the base station in response to the uplink message, second control signaling indicating a set of resources for performing a link configuration procedure between the first UE and the second UE, and communicating, via the one or more ADs, with the first UE and the second UE based on the second control signaling.

An apparatus for wireless communication at an AN is described. The apparatus may include a processor, memory coupled with the processor, and instructions stored in the memory. The instructions may be executable by the processor to cause the apparatus to receive, from the base station in response to a request for the base station to establish a wireless communication link between a first UE and a second UE via one or more ADs of the AN, first control signaling including an indication for the AN to perform a directional learning procedure with the first UE, transmit, to the base station and based on the first control signaling, an uplink message including an indication of a completion of the directional learning procedure performed with the first UE, receive, from the base station in response to the uplink message, second control signaling indicating a set of resources for performing a link configuration procedure between the first UE and the second UE, and communicate, via the one or more ADs, with the first UE and the second UE based on the second control signaling.

Another apparatus for wireless communication at an AN is described. The apparatus may include means for receiving, from the base station in response to a request for the base station to establish a wireless communication link between a first UE and a second UE via one or more ADs of the AN, first control signaling including an indication for the AN to perform a directional learning procedure with the first UE, means for transmitting, to the base station and based on the first control signaling, an uplink message including an indication of a completion of the directional learning procedure performed with the first UE, means for receiving, from the base station in response to the uplink message, second control signaling indicating a set of resources for performing a link configuration procedure between the first UE and the second UE, and means for communicating, via the one or more ADs, with the first UE and the second UE based on the second control signaling.

A non-transitory computer-readable medium storing code for wireless communication at an AN is described. The code may include instructions executable by a processor to receive, from the base station in response to a request for the base station to establish a wireless communication link between a first UE and a second UE via one or more ADs of the AN, first control signaling including an indication for the AN to perform a directional learning procedure with the first UE, transmit, to the base station and based on the first control signaling, an uplink message including an indication of a completion of the directional learning procedure performed with the first UE, receive, from the base station in response to the uplink message, second control signaling indicating a set of resources for performing a link configuration procedure between the first UE and the second UE, and communicate, via the one or more ADs, with the first UE and the second UE based on the second control signaling.

Some examples of the method, apparatuses, and non-transitory computer-readable medium described herein may further include operations, features, means, or instructions for receiving, via the first control signaling, an indication of an additional set of resources for performing the directional learning procedure with the first UE and performing directional learning communications with the first UE within the additional set of resources to perform the directional learning procedure, where transmitting the uplink message may be based on the performance of the directional learning communications.

Some examples of the method, apparatuses, and non-transitory computer-readable medium described herein may further include operations, features, means, or instructions for receiving, via the first control signaling, an indication of a position of the first UE, a first direction of the first UE relative to the AN, or both and performing directional learning communications with the first UE based on the position, the direction, or both, where transmitting the uplink message may be based on the performance of the directional learning communications.

Some examples of the method, apparatuses, and non-transitory computer-readable medium described herein may further include operations, features, means, or instructions for transmitting, via the uplink message, a measurement report associated with wireless communications between the first UE and the AN, a QCL associated with the AN, or both, where receiving the second control signaling may be based on the measurement report, the QCL, or both.

Some examples of the method, apparatuses, and non-transitory computer-readable medium described herein may further include operations, features, means, or instructions for communicating with the first UE within the set of resources for the link configuration procedure in accordance with a set of multiple link configurations associated with the one or more ADs of the AN, where communicating with the first UE and the second UE includes communicating in accordance with a link configuration of the set of multiple link configurations.

Some examples of the method, apparatuses, and non-transitory computer-readable medium described herein may further include operations, features, means, or instructions for receiving, via the second control signaling, an indication of the set of multiple link configurations.

DETAILED DESCRIPTION

Figure 1:
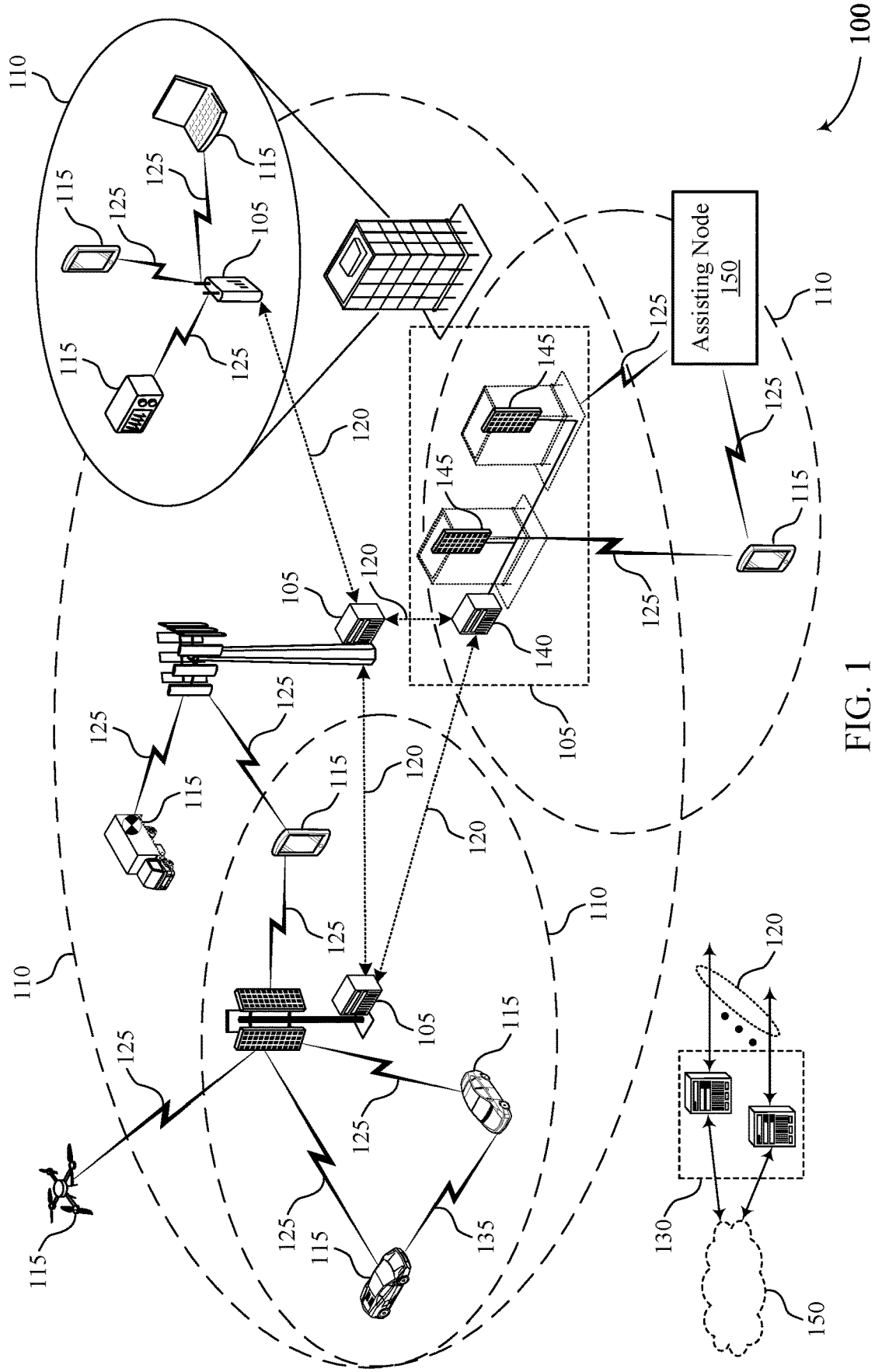
FIG. 1 illustrates an example of a wireless communications system that supports techniques for assisted sidelink bearer establishment in accordance with aspects of the present disclosure.

Some wireless communications systems may utilize assisting devices (ADs) connected to assisting nodes (ANs) to facilitate wireless communications between wireless devices. ANs may be used to relay, forward, reflect, and amplify signals transmitted from one wireless device to another wireless device. For example, an AN may control or utilize one or more ADs to relay sidelink communications received from a first user equipment (UE) to another UE. The use of ANs (which control ADs) may increase a power and/or reliability of wireless communications, and may extend a range over which wireless devices may communicate. However, in some networks, there may be multiple candidate ADs controlled by multiple ANs which may be used to establish links between wireless devices, and it may be unclear which AD and/or AN should be used. Additionally, when establishing a link between wireless devices via ADs associated with (e.g., controlled by) an AN, the AN may be required to sweep through large quantities of beams and/or AD configurations (e.g., link configurations) to determine which beam/link configuration should be used. This process may be time consuming and computationally expensive, which may increase a latency of wireless communications.

Accordingly, aspects of the present disclosure are directed to techniques which enable base stations to assist with establishing wireless links via one or more ADs controlled by one or more ANs. For example, a first UE may transmit a request for a base station to facilitate establishment of a link with a second UE via one or more ADs of an AN (e.g., AN discovery request). In some cases, the first UE may transmit the request after being unable to establish a direct link with the second UE. The request may include information associated with the second UE and/or surrounding ANs (e.g., positions of AN/second UE). Subsequently, the base station may instruct one or more ANs to perform a directional learning procedure with the first and second UEs. The respective UEs and ANs may transmit reports (e.g., measurement reports) associated with the respective directional learning procedures, which may enable the base station to select which AD and/or AN should be used to facilitate communications between the first and second UEs based on the received reports. The base station may then instruct the UEs and selected AN to perform a link configuration procedure to identify which link configuration (e.g., which AD configuration) at the AN should be used to facilitate communications between the respective UEs.

Aspects of the disclosure are initially described in the context of wireless communications systems. Additional aspects of the disclosure are described in the context of an example directional learning procedure and an example process flow. Aspects of the disclosure are further illustrated by and described with reference to apparatus diagrams, system diagrams, and flowcharts that relate to techniques for assisted sidelink bearer establishment.

FIG. 1 illustrates an example of a wireless communications system 100 that supports techniques for assisted sidelink bearer establishment in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $Ts=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), highest signal-to-interference-plus-noise ratio (SINR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UEs 115 and the base stations 105 of the wireless communications system 100 may support techniques which enable base stations 105 to assist with establishing wireless links via ANs 155. For example, a first UE 115 of the wireless communications system 100 may transmit a request for a base station 105 to facilitate establishment of a link with a second UE 115 via an AN 155 (e.g., AN discovery request). In some cases, the first UE 115 may transmit the request after being unable to establish a direct link with the second UE 115. The request may include information associated with the second UE 115 and/or surrounding ANs 155 (e.g., position of identified ANs 155, position of second UE 115). Subsequently, the base station 105 may instruct one or more ANs 155 to perform a directional learning procedure with the first and second UEs 115.

Upon completion of the directional learning procedure, the respective UEs 115 and ANs 155 may transmit reports (e.g., measurement reports) associated with the respective directional learning procedures, which may enable the base station 105 to select which AN 155 should be used to facilitate communications between the first and second UEs 115 based on the received reports. The base station 105 may then instruct the UEs 115 and selected AN 155 to perform a link configuration procedure to identify which link configuration at the AN 155 should be used to facilitate communications between the respective UEs 115. Subsequently, after establishing the communication link and configuring the AN 155, the first UE 115 and the second UE 115 may communicate via the AN 155 (e.g., the AN 155 may relay or forward wireless communications between the UEs 115).

Techniques described herein may enable improved establishment of wireless links via ANs 155. In particular, techniques described herein may enable base stations 105 to facilitate establishment of wireless links through ANs 155, which may expedite the sidelink bearer establishment via ANs 155. In particular, base stations 105 may provide information to ANs 155 which may enable ANs 155 to sweep through fewer quantities of candidate beams and/or candidate link configurations, thereby expediting the establishment of wireless communications with ANs 155. Moreover, information provided by the base station 105 during an AN 155 establishment procedure may enable the network to establish wireless connections between wireless devices via ANs 155 which will result in more efficient and reliable wireless communications.

Figure 2:
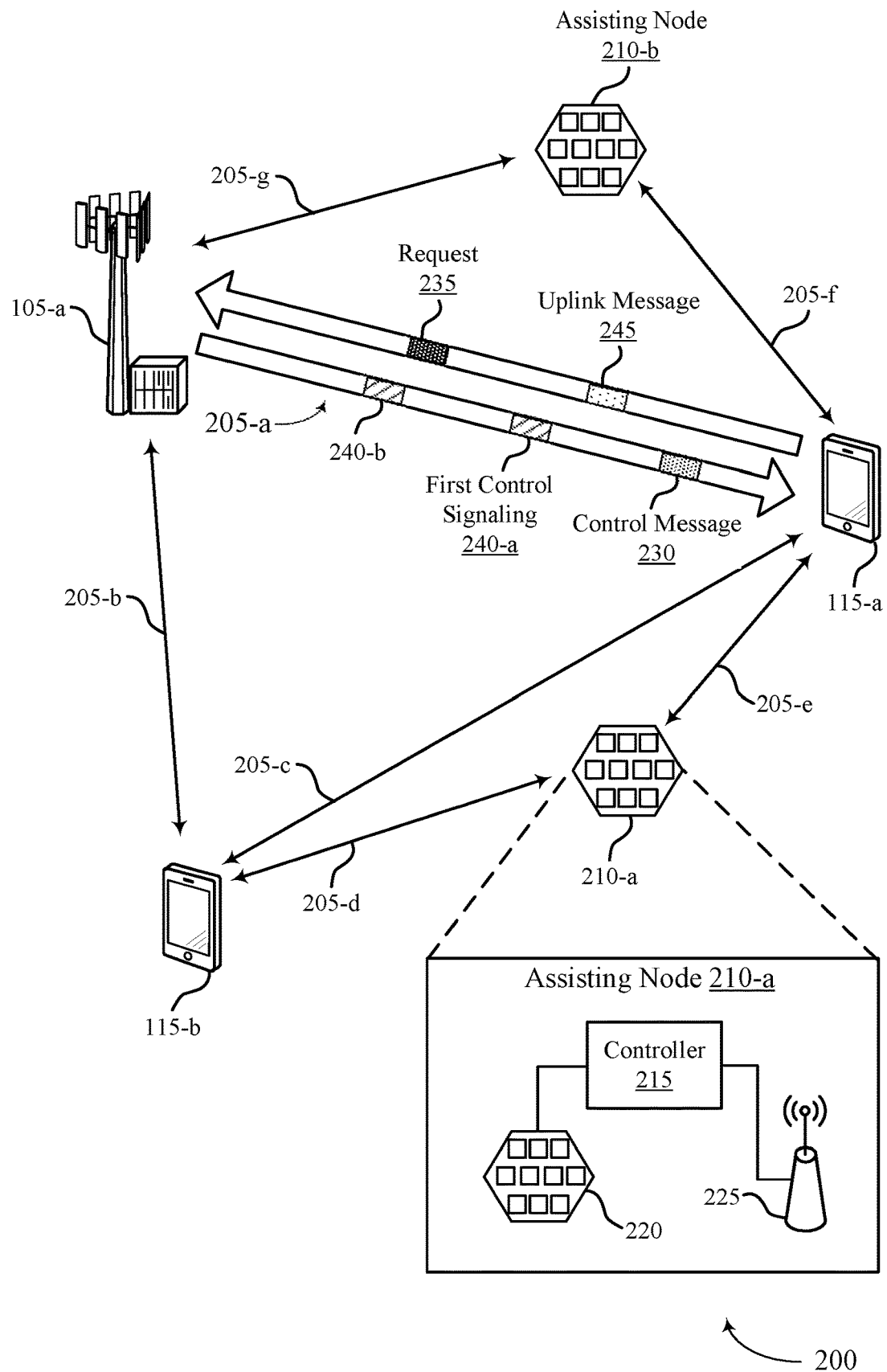
FIG. 2 illustrates an example of a wireless communications system that supports techniques for assisted sidelink bearer establishment in accordance with aspects of the present disclosure.

FIG. 2 illustrates an example of a wireless communications system 200 that supports techniques for assisted sidelink bearer establishment in accordance with aspects of the present disclosure. In some examples, wireless communications system 200 may implement, or be implemented by, aspects of wireless communications system 100. The wireless communications system 200 may include a base station 105-a, a first UE 115-a, a second UE 115-b, a first AN 210-a, and a second AN 210-b, which may be examples of base stations 105, UEs 115, and ANs 155 described with reference to FIG. 1.

Each of the UEs 115-a, 115-b may communicate with the base station 105-a using one or more communication links 205. For example, the first UE 115-a may communicate with the base station 105-a via a communication link 205-a, and the second UE 115-b may communicate with the base station 105-b via a communication link 205-b. In some cases, the communication links 205-a, 205-b may include examples of access links (e.g., Uu links). The communication links 205-a, 205-b may include bi-directional links that can include both uplink and downlink communication. For example, the first UE 115-a may transmit uplink transmissions, such as uplink control signals or uplink data signals, to the base station 105-a via communication link 205-a, and the base station 105-a may transmit downlink transmissions, such as downlink control signals or downlink data signals, to the first UE 115-a via the communication link 205-a.

Similarly, the first UE 115-a and the second UE 115-b may communicate with one another via a communication link 205-c, which may be an example of a sidelink communication link or a PC5 link. In some aspects, the ANs 210-a, 210-b may facilitate wireless communications between the respective devices of the wireless communications system 200 by controlling one or more ADs 220 associated with each respective AN 210. For example, the first AN 210-a may enable or facilitate wireless communications between the first UE 115-a and the second UE 115-b via communications links 205-d and 205-e by controlling one or more ADs 220.

Communications links 205-d and 205-e may include examples of sidelink communication links or PC5 links. By way of another example, the second AN 210-b may enable or facilitate wireless communications between the first UE 115-a and the base station 105-a via communications links 205-f and 205-g via one or more ADs 220. Communications link 205-f may include an example of a sidelink communication link or PC5 link, and the communication link 205-g may include an example of an access link or Uu link.

As noted previously herein, ANs 210 may be used to relay, forward, reflect, and amplify signals transmitted from one wireless device to another wireless device. For the purposes of the present disclosure, the term "AN 210" may be used to refer to a wireless node (e.g., wireless device) which is capable of communication over Uu and sidelink communications links, and which controls one or more ADs 220 via a one or more controllers. Accordingly, as shown in FIG. 2, an AN 210 may include a controller 215, one or more ADs 220, other wireless communications components 225, or any combination thereof. An AD 220 may include a relay, repeater, reconfigurable intelligent surface (RISs), meta-surface, active antenna units (AAU), and the like. The AD 220 may be configured to boost signal strength and/or steer signals in a required direction. In some aspects, the AD 220 may be controlled via the controller 215 of the AN 210. In this regard, the AN 210 may be configured to facilitate wireless communications by controlling one or more ADs 220. In this regard, phrases herein which state that an AN 210 facilitates wireless communications may be understood to state that the AN 210 controls one or more ADs 220 to facilitate wireless communications. For example, an AN 210 may utilize first and second RISs to facilitate forward and backward communications, respectively, between wireless devices.

In some aspects, an AN 210 may communicate (via Uu or sidelink) with other communication devices or nodes to determine a link configuration (e.g., AN/AD link configuration) which should be used at the respective AD 220 controlled by the AN 210. Using the communication exchange, the AN 210 may be configured to control the configuration of the AD 220 for each time instance. Each AN 210 may be configured to perform wireless communications over Uu links, sidelink communication links, or both. Moreover, ANs 210 may include a base station 105 (e.g., gNB), an access point, a roadside unit (RSU) deployed by an operator, or any combination thereof. For example, in some cases, the wireless communications system 200 may include ANs 210 which are attached to lamp posts, buildings, street signs, busses, and other devices to facilitate wireless communications between wireless devices of the wireless communications system 200.

For example, as shown in FIG. 2, the first AN 210-a may facilitate wireless communicants between the first UE 115-a and the second UE 115-b via an "assisted sidelink connection" by controlling one or more ADs 220 associated with the AN 210-a. For the purposes of the present disclosure, the term assisted sidelink connection may refer to a sidelink connection including one or more communication links (e.g., communication links 205-d, 205-e) which are aided or assisted by one or more ANs 210. ANs 210 may improve an efficiency and reliability of wireless communications, particularly in the case of V2V and D2D, as these links may change much faster as compared to Uu links due to the mobility of UEs 115 and other wireless devices (e.g., vehicles) and the changing environments as a result of motion.

ANs 210 may enable creation of beam pair links (BPLs) and may improve wireless communications by amplifying and forwarding received signals, reflecting signals received from one wireless device to another wireless device (e.g., to circumvent obstructions), by decoding and forwarding data packets (e.g., relaying information), or any combination thereof. As will be described in further detail herein, facilitating BPLs may be particularly relevant for directional communications where UEs 115 (through the use of ADs 220) form directional Tx and Rx beams to communicate with one another. As such, facilitating BPLs may be particularly important in the context of higher frequency bands, such as mmW bands. In contrast, lower frequency bands, such as sub-6 GHz communication bands, may be omnidirectional, and hence do not need to beamform at the Tx and the Rx.

In some aspects, the communication link 205 between the respective UEs 115 (e.g., sidelink communication links) and the ANs 210 may be included within a sidelink network of the wireless communications system 200. The sidelink network (e.g., sidelink network including the sidelink communication links 205-c, 205-d, 205-e, 205-f) may be configured to operate in a "Mode 1" and/or a "Mode 2." While operating in Mode 1, the sidelink network (e.g., communication link 205) may be managed (e.g., coordinated) by a base station 105-a. In this regard, during Mode 1 operation, a base station 105-a may manage resource allocation over the sidelink communication link 205, and may allocate sets of resources within the sidelink communication link 205 to the respective UEs 115. In some cases, the base station 105-a may allocate sets of sidelink resources to the respective UEs 115 during Mode 1 operation via RRC signaling, downlink control information (DCI) messages (e.g., DCI 3_0), or both. During Mode 1 operation, the base station 105-a may allocate sidelink resources via dynamic grants, configured grants (e.g., type 1 configured grants, type 2 configured grants), or both. Within Mode 1 operation, a modulation and coding scheme (MCS) used for communications over the communication link 205 (e.g., sidelink communication link) may be left up to the respective UEs 115, within limits which are pre-configured at the UEs 115 and/or signaled by the base station 105-a. The UEs 115 and ANs 210 may be required to be within a geographical coverage area of the base station 105-a in order to operate in Mode 1.

Comparatively, while operating in Mode 2, the sidelink network (e.g., sidelink communication links 205-c, 205-d, 205-e, 205-f) may not be managed (e.g., may not be coordinated) by a base station 105-a. Without coordination or management of the resources of the sidelink network during the Mode 2 operation, the UEs 115 may be configured to monitor the sidelink network (e.g., monitor sidelink communication link 205 and/or other sidelink communication links), and determine sets of sidelink resources which are available for transmission of sidelink messages via the sidelink communication link 205. For example, the first UE 115-a may "autonomously" determine sidelink resources which are to be used within the communication links 205-c, 205-d by monitoring the sidelink network including sidelink communication links, and decoding all physical sidelink control channels (PSCCH) and physical sidelink shared channels (PSSCHs) within the communication link 205 and sidelink network to identify sidelink resources which have been reserved by other UEs 115. Subsequently, the first UE 115-a may report available sidelink resources to the upper layer, and may transmit a sidelink control information (e.g., SCI) which reserves a set of sidelink resources for a sidelink communication to be performed (e.g., transmitted, received) at the first UE 115-a.

In this regard, Mode 2 operation of the sidelink network including the communication link 205 may follow contention-based access procedures in which the various UEs 115 to "compete" for the use of the sidelink network, including the communication link 205. Moreover, as compared to Mode 1, the UEs 115 and ANs 210 may not be required to be within a geographical coverage area of the base station 105-a in order to operate in Mode 2. In other words, Mode 1 may only be used while inside of cell coverage, whereas Mode 2 may be used inside and outside of cell coverage. For the purposes of simplicity, and unless noted otherwise herein, description of the wireless communications system 200 may be assumed to be operated in Mode 1. As such, in Mode 1, the UEs 115-a, 115-b are connected to the base station 105-a via sub-6 Uu links and/or mmW links (e.g., communication links 205-a, 205-b) and the base station 105-schedules and controls sidelink communications (e.g., sidelink communications over mmW bands).

In some cases, a UE 115 may determine that it is unable to form a radio bearer (e.g., establish a wireless link) with an intended peer. For example, the first UE 115-a may determine that it is unable to establish wireless communications with the second UE 115-b. In such cases, ANs 210 within the wireless communications system 200 may assist with link establishment between the UEs 115-a, 115-b by controlling one or more ADs 220 associated with the respective AN 210. However, some wireless communications systems 200 may include multiple candidate ANs 210 (e.g., multiple candidate ADs 210 controlled by candidate ANs 210) which may potentially aid with link formation, and it may be unclear which AN 210 and/or AD 220 should be used. Moreover, multiple UEs 115 may use one of a set of common ANs 210 for establishment of data radio bearers (DRBs), which may result in increased traffic and interference. Further, when establishing wireless links via an AN 210, the AN 210 may be required to sweep through large quantities of candidate beams (e.g., perform many beam searches) and link configurations (e.g., AD configurations), particularly in the context of mmW communications. For example, in order to establish a DRB between the UEs 115-a, 115-b, the AN 210-a may be required to scan through many combinations of Tx and Rx beam combinations to determine which beams should be used. Taken together, when multiple ANs 210 are present within a network, searching for a BPL through each respective AN 210 and AD 220 may be extremely time consuming and computationally expensive, which may increase a latency of wireless communications.

Accordingly, the wireless communications system 200 may support techniques for assisted sidelink bearer establishment in Mode 1 sidelink operation. In particular, aspects of the present disclosure may enable the base station 105-a to aid AN 210 link establishment by synchronizing measurements across multiple UEs 115 and ANs 210 (and therefore ADs 220). According to aspects of the present disclosure, the base station 105 may facilitate sidelink bearer establishment in response to requests (e.g., AN discovery requests) received from UEs 115, and may provide information to the UEs 115 and/or ANs 210 which may lead to more efficient and effective sidelink bearer establishment via ANs 155. As such, techniques described herein may enable low latency and low complexity assisted link establishment with mobile ANs 210.

For example, as shown in FIG. 2, the base station 105-a may transmit a control message 230 to the first UE 115-a, the second UE 115-b, or both, where the control message 230 indicates one or more parameters or characteristics for establishing wireless links with ANs 210 (e.g., AD 220 controlled by AN 210-a). For example, in some cases, the control message 230 may indicate a set of resources for transmitting requests 235 to the base station 105-a for establishing wires connections between wireless devices via ADs 220 controlled via ANs 210 (e.g., AN discovery requests 235). For instance, the control message 230 may indicate a periodicity of a set of transmission occasions which the UEs 115 may use to transmit requests 235 to the base station 105-a for assisted AN link establishment. The control message 230 my include, but is not limited to, an RRC message, a DCI message, a MAC-CE message, or any combination thereof.

In some cases, the first UE 115-a may identify that it is unable to establish a sidelink communication link with the second UE 115-b. In other words, the UE 115-a may identify that it is unable to establish a direct sidelink data bearer with the second UE 115-*b*. In some cases, the first UE 115-*a* may identify that it is unable to establish a DRB (e.g., mmW sidelink radio bearer) with its intended peer (e.g., second UE 115-*b*) based on a sidelink beam search procedure. In other cases, the first UE 115-*a* may identify that a feasible beam pair link with the second UE 115-*b* does not exists, or that potential beam pair links do not meet quality of service (QOS) requirements.

In some aspects, the first UE 115-*a* may identify one or more neighboring (e.g., surrounding) ANs 210, including the AN 210-*a*. In other words, the UE 115-*a* may identify one or more ANs 210 which are within a range (e.g., pre-defined range) of the first UE 115-*a*. For example, the first UE 115-*a* may identify the first AN 210-*a* and the second AN 210-*b* as candidate ANs 210 (e.g., neighboring ANs 210) which may be used to facilitate wireless communications with the second UE 115-*b* (e.g., candidate ADs 220 controlled by candidate ANs 210). In some aspects, the first UE 115-*a* may identify the one or more neighboring ANs 210 based on being unable to establish a wireless connection with the second UE 115-*b* at 410.

The first UE 115-*a* may identify the one or more neighboring ADs 220 and/or neighboring ANs 210 using any techniques, including transmission of AN discovery messages, reception of messages from neighboring ANs 210, or both. For example, the first UE 115-*a* may identify neighboring ANs 210 over sidelink communications if the neighboring ANs 210 are configured to transmit AN discovery signals over sidelink. In other cases, the first UE 115-*a* may identify neighboring ANs 210 based on signaling from the base station 105-*a*.

The first UE 115-*a* may transmit a request 235 for the base station 105-*a* to establish a wireless communication link between the first UE 115-*a* and the second UE 115-*b* via at least one AD 220 controlled by at least one AN 210 (e.g., AN 210-*a*). In other words, the first UE 115-*a* may transmit an AN discovery request 235 for the base station 105-*a* to assist with establishing a wireless connection with the second UE 115-*b* via one or more ANs 210. In some aspects, the request 235 may include an indication of the second UE 115-*b*, the identified neighboring ANs 210, or both.

The first UE 115-*a* may transmit the request 235 based on receiving the control message 230, identifying the inability to establish a wireless connection with the second UE 115-*b*, identifying neighboring ANs 210, or any combination thereof. For example, in some implementations, the first UE 115-*a* may transmit the request 235 within a set of resources which were allocated for AN discovery requests 235 via the control message 230. For instance, the first UE 115-*a* may transmit the request 235 within a transmission occasion for communicating AN discovery requests 235 which was configured via the control message 230. In such cases, the control message 230 may configure the UEs 115 to periodically transmit AN discovery requests in cases where the respective UEs 115 determine a need to facilitate communications with intended peers via one or more ANs 210/ADs 220. For instance, the control message 230 may indicate a periodicity of 100 ms for transmission occasions for requests 235, in which case the first UE 115-*a* may transmit the request only at specific time frames determined according to the periodicity of the transmission occasions. In other cases, the first UE 115-*a* may transmit the request as needed, or on demand, such as when the first UE 115-*a* determines a BPL establishment failure.

In some aspects, the request 235 may include information or parameters associated with the second first UE 115-*a*, the second UE 115-*b*, neighboring ANs 210 and/or ADs 220, or any combination thereof. Information associated with the respective wireless devices may help the base station 105-*a* establish wireless communications between the UEs 115-*a*, 115-*b* via an AN210. For example, the request 235 may include one or more parameters associated with the second UE 115-*b*, including a destination identifier, a peer layer 2 (L2) identifier, a geographical location, a sidelink zone identifier, a cell identifier, a type of communication service to be established with the second UE 115-*b* (e.g., service type), or any combination thereof. For instance, the request 235 may indicate geographical positions of the first UE 115-*a*, the second UE 115-*b*, or both, such that the base station 105-*a* may more efficiently identify ANs 210 which may facilitate communications between the respective UEs 115-*a*, 115-*b*.

Additionally, or alternatively, the request 235 may include information associated with the neighboring ANs 210 (and corresponding ADs 220) which were identified by the first UE 115-*a*. Information associated with each respective neighboring AN 210 (e.g., AN 210-*a*) which may be included within the request 235 may include, but is not limited to, a geographical position of each respective neighboring AN 210 and/or AD 220, a distance between the first UE 115-*a* and each neighboring AN 210 and/or AD 220, a signal strength metric associated with signals received from each respective neighboring AN 210 and/or AD 220 (e.g., reference signal received power (RSRP), received signal strength indicator (RSSI)), a signal quality metric associated with signals received from each respective neighboring AN 210 and/or AD 220 (e.g., reference signal received quality (RSRQ), SNR, SINR, channel quality indicator (CQI)), or any combination thereof.

Upon receiving the request 235 (e.g., AN discovery request 235), the base station 105-*a* may identify one or more candidate ANs 210 (or corresponding ADs 220) within the wireless communications system 200 which may be used to facilitate communications between the first UE 115-*a* and the second UE 115-*b*. In other words, the base station 105-*a* may identify a list of potential ANs 210 (and corresponding ADs 220) which may aid the first UE 115-*a* trying to establish a radio bearer with the second UE 115-*b*. The base station 105-*a* may identify one or more candidate ANs 210 and/or candidate ADs 220 based on its own information associated with ANs 210 within the wireless communications system 200 and/or based on ANs 210 identified within the request 235.

In some aspects, the base station 105-*a* may transmit first control signaling 240-*a* to the first UE 115-*a*, the second UE 115-*b*, the AN 210-*a*, or any combination thereof. In some aspects, the first control signaling 240-*a* may include an indication for the first UE 115-*a*, the second UE 115-*b*, or both, to perform a directional learning procedure with one or more ANs 210 (e.g., directional learning notification). As such, the first control signaling 240-*a* may instruct one or more ANs 210 to form/identify beam pair links with the first UE 115-*a* and the second UE 115-*b* (via ADs 220 controlled by the respective ANs 210). For the purposes of the present disclosure, the term "directional learning procedure" may be used to refer to a procedure in which wireless devices (e.g., UEs 115, ANs 210) scan through candidate beams, candidate beam pair links, and/or candidate AD/link configurations (e.g., RIS configurations) to identify or select beams, beam pair links, and/or AD configurations which may facilitate wireless communications between the respective wireless devices.

For example, the first control signaling 240-*a* may indicate for the AN 210-*a* to perform a directional learning procedure with the first UE 115-*a* and the second UE 115-*b*. In some implementations, the first control signaling 240-*a* may indicate for the first and second UEs 115-*a*, 115-*b* to perform directional learning procedures with multiple candidate ANs 210. The first control signaling 240-*a* may include an RRC message, a DCI message, a MAC-CE message, or any combination thereof. In some aspects, the base station 105-*a* may transmit the first control signaling 240-*a* based on (e.g., in response to) receiving the request 235 (e.g., AN discovery request 235) at 420.

In some aspects, the first control signaling 240-*a* may include information which may assist the respective wireless devices (e.g., first UE 115-*a*, second UE 115-*b*, AN 210-*a*) to perform the directional learning procedure. Information which may be included within the first control signaling 240-*a* may include, but is not limited to, a set of resources (e.g., time resources, frequency resources, spatial resources) for performing the directional learning procedure, a position of the respective wireless devices (e.g., geographical positions and/or directions of the UEs 115-*a*, 115-*b* and AN 210-*a* relative to one another), and the like. For example, the first control signaling 240-*a* may indicate time/frequency resource in which the respective wireless devices are to perform the directional learning procedure. In other words, the base station 105-*a* may indicate sets of resources for a directional learning procedure in which the respective UEs 115-*a*, 115-*b* and ANs 210 may use to perform beam training to identify beams at the respective ANs 210 which will be used to determine a possible configuration of the one or more ADs 220 controlled by the respective AN 210 in order to facilitate wireless communications between the UEs 115-*a*, 115-*b*. In some cases, the resources for the directional learning procedure may be included within a pool dedicated for beam training, within a set of physical sidelink shared channel (PSSCH) resources, or both.

Other information which may be included within the first control signaling 240-*a* to facilitate the directional learning procedure may include, but is not limited to, reference/synchronization signal sequences which are to be used by each respective AN 210 during the directional learning procedure, reference signals for beam measurement, sets of beam training references signals that the AN 210 should measure, sets of measurement occasions for beam training, Additionally, or alternatively, the first control signaling 240-*a* may include directional and positional information available at the base station 105-*b*, and the like. For example, the first control signaling 240-*a* may indicate geographical positions and/or relative directions of the of the respective wireless devices to facilitate a more efficient and directional learning procedure. The inclusion of directional/positional information for the directional learning procedure may reduce a beam search space which must be searched/swept through during the directional learning procedure. In other words, the inclusion of geographical positions/relative directions of the respective wireless devices may reduce a quantity of beams over which the AN 210-*a* is required to sweep through during the directional learning procedure.

In some aspects, what information the base station 105-*a* includes within the first control signaling 240-*a*, and how the base station 105-*a* instructs the respective wireless devices to perform/report the directional learning procedures, may be based on (pre)configuration) or network configuration. In other cases, the base station 105-*a* may make what information to include within the first control signaling 240-*a* and how directional learning procedures should be performed/reported based on the quantity of ANs 210 and UEs 115 which are being trained (e.g., how many directional learning procedures are to be performed within the wireless communications system 200). For example, the base station 105-*a* may instruct the wireless devices to utilize one reporting mechanism (e.g., AN-only reporting) for directional learning procedures in cases where the number of UEs 115 and/or ANs 210 is less than some threshold (or quantity of UEs 115 is greater than quantity of candidate ANs 210), and may instruct the wireless devices to utilize another reporting mechanism (e.g., AN and UE reporting) for directional learning procedures in cases where the number of UEs 115 and/or ANs 210 is less greater than some threshold (or quantity of UEs 115 is less than quantity of candidate ANs 210).

The directional learning procedure may be further shown and described with reference to FIG. 3.

Figure 3:
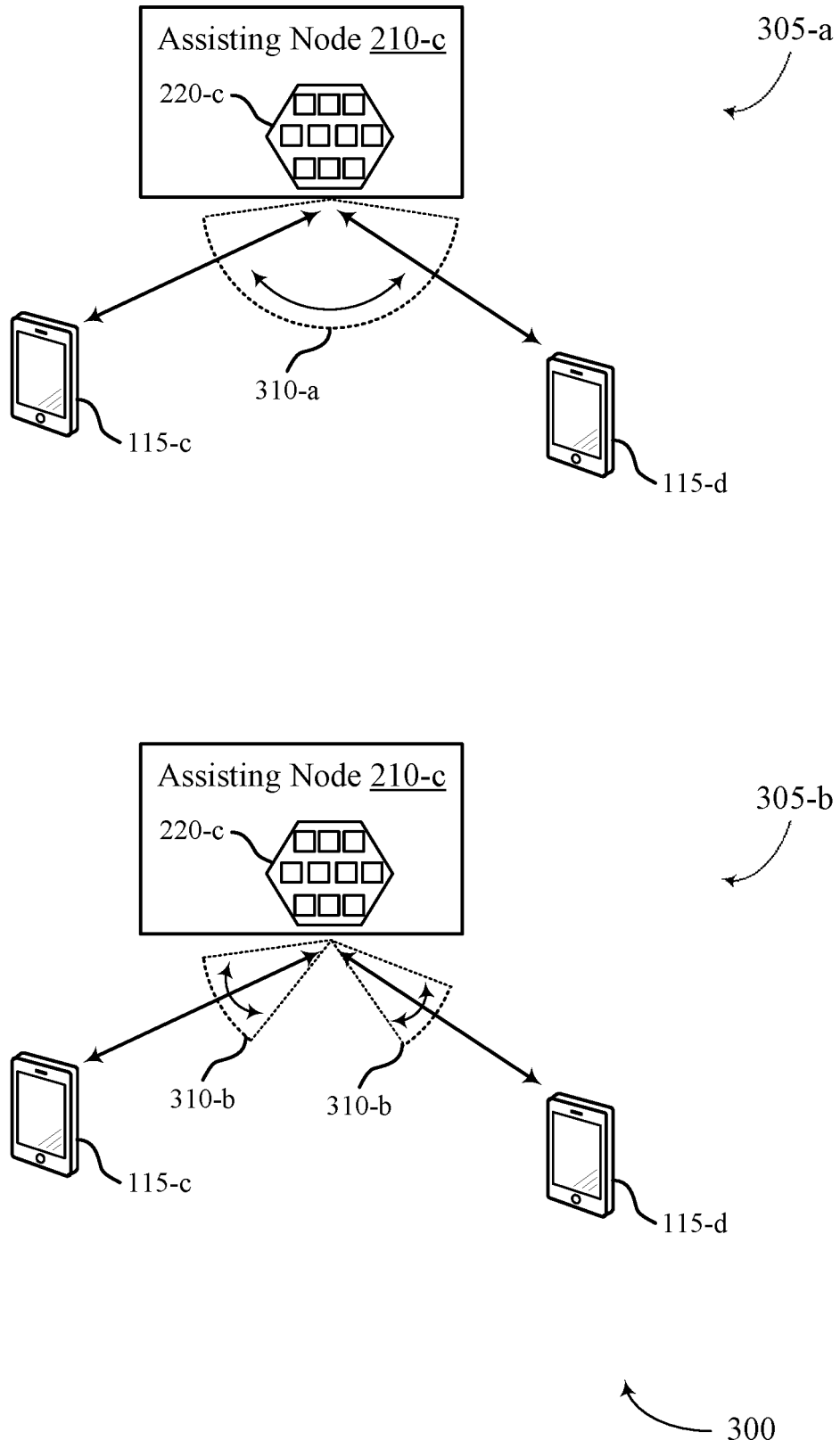
FIG. 3 illustrates an example of a directional learning procedure that supports techniques for assisted sidelink bearer establishment in accordance with aspects of the present disclosure.

FIG. 3 illustrates an example of a directional learning procedure 300 that supports techniques for assisted sidelink bearer establishment in accordance with aspects of the present disclosure. Aspects of the directional learning procedure may implement, or may be implemented by, aspects of the wireless communications system 100, wireless communications system 200, or both. In particular, the directional learning procedure 300 may be implemented by the wireless devices of the wireless communications system 200 to identify beam pairs (e.g., Tx/Rx beam pairs) which will be used at an AN 210 (e.g., first AN 210-*a*) to facilitate wireless communications between other wireless devices (e.g., first UE 115-*a*, second UE 115-*b*).

The directional learning procedure 300 illustrated in FIG. 3 depicts a first UE 115-*c*, a second UE 115-*d*, and an AN 210-*c* including an AD 220-*c*, which may be examples of corresponding devices described in FIG. 2. For example, the first UE 115-*c* and the second UE 115-*d* illustrated in FIG. 3 may include examples of the first UE 115-*a* and the second UE 115-*b*, respectively, as illustrated in FIG. 2. Similarly, the AN 210-*c* and AD 220-*c* illustrated in FIG. 3 may include an example of the first AN 210-*a* and the AD 220-*a*, respectively, as illustrated in FIG. 2. The AN 210-*c* and AD 220-*c* may include any type of AN 210 and AD 220 known in the art. For example, as shown in FIG. 3, the AD 220-*c* may include a RIS which is controlled by the AN 210-*c* to facilitate wireless communications between the UEs 115-*c*, 115-*d*. In some cases, the AN 220-*c* may include multiple ADs 220.

As noted previously herein, directional learning procedures may be performed between the AN 210-*c* and the UEs 115-*c*, 115-*d* to identify beams (e.g., beam pairs) which will be used at the AN 210 to facilitate wireless communications between the UEs 115-*c*, 115-*d*. In this regard, directional learning may be a powerful tool to reduce the overhead associated with assisted beam training.

For example, referring to the first configuration 305-*a*, the AD 220-*c* may include a RIS. In order to facilitate communications between the UEs 115-*c*, 115-*d*, the AN 210-*c* (e.g., AD 220-*c*) may need to determine the incident angles between the respective UEs 115-*c*, 115-*d*. As such, without directional learning, the AN 210-*c* may be configured to scan through all possible RIS configurations (e.g., all possible Tx/Rx beam pairs, all possible incidence-reflection angle pairs) to determine the optimal AD configuration to facilitate wireless communications between the first UE 115-*c* and the second UE 115-*b*. In other words, without directional learning, the AN 210-*c* may be required to scan through an exhaustive set of AD configurations 310-*a* to identify which AD configuration is optimal for the link between the first and second UEs 115-*c*, 115-*d*.

Moreover, the AN 210-*c* may be required to determine the correct phase control parameters (e.g., phase/control parameters of the AD 220-*c*) such that the incidence angle of the identified beam configuration reflects signals from the first UE 115-*c* to the second UE 115-*b*, and vice versa. As such, for a full search illustrated in the first configuration 305-*a*, the AN 210-*c* may be required to scan over multiple angles of incidence (e.g., scan through the full set of AD configurations 310-*a*) to determine the angle of incidence of a wave from the second UE 115-*d* to the AD 220-*c* (e.g., RIS) (and vice versa). Further, for each angle of incidence, the AN 210-*c* may be required to scan over all possible reflection angles for a waveform reflected from the AD 220-*c* to the first UE 115-*a* (and vice versa). Such scanning may be a time consuming and computationally expensive process. For example, in cases where the AN 210-*c* is configured to scan beams/incidence angles with a 10° granularity, scanning 180° relative to the AN 210-*c* would include 324 measurements.

Comparatively, with directional learning, the AN 210-*c* may be able to reduce the configuration search space (e.g., reduce the set of AD configurations 310-*a* which are to be scanned through) based on the beam training between the AN 210-*c*/AD 220-*c* and the respective UEs 115-*c*, 115-*d*. For example, referring to the second configuration 305-*b*, with directional learning, the AN 210-*c* may only need to scan through two sectors of a set of AD configurations 310-*b* in order to determine the beam pair (e.g., angles of incidence) which will be used to facilitate wireless communications between the UEs 115-*c*, 115-*d*.

As shown by a comparison of the first set of AD configurations 310-*a* shown in the first configuration 305-*a* and the second set of AD configurations 310-*b* shown in the second configuration 305-*b*, directional learning may significantly reduce a quantity of AD configurations 310/ incidence angles which must be swept through. In some cases, information included within the first control signaling 240-*a* illustrated in FIG. 2 (e.g., positional/directional information of the UEs 115-*c*, 115-*d*) may enable the AN 210-*c* to reduce the set of AD configurations 310-*a* to the second set of AD configurations 310-*b*. For example, assuming a wide beam width of 30, the AN 210-*c* (e.g., RIS) may only need to scan the two 30° sectors (e.g., two 30° sectors of the second set of AD configurations 310-*b*) to determine the best AD configuration, which may require only 3×3=9 sweeps at a 10° granularity. Comparatively, assuming a 6° granularity, sweeping through the second set of AD configurations 310-*b* may require a total of 25 measurements.

Taken together, the directional learning techniques may reduce a search space set of beam configurations/AD configurations which must be swept across during the directional learning procedure at the AN 210-*c*, which may reduce a time required for the directional learning procedure, and reduce computational complexity.

Reference will again be made to FIG. 2. In some aspects, the first UE 115-*a*, the second UE 115-*b*, the AN 210-*a*, or any combination thereof, may be configured to perform a directional learning procedure. In particular, as described with reference to FIG. 3, the respective wireless devices may be configured to perform the directional learning procedure in order to determine one or more beams (e.g., one or more directions) which will be used for wireless communications between the AN 210-*a* and the respective UEs 115-*a*, 115-*b*. In this regard, the respective wireless devices may perform directional learning communications in which the respective wireless devices sweep through candidate beams and/or beam pairs (e.g., Tx/Rx beam pairs) to identify beams and relative directions between the respective wireless devices.

In some aspects, the wireless devices (e.g., first UE 115-*a*, second UE 115-*b*, AN 210-*a*) may perform the directional learning procedure based on receiving the control message 230, identifying the inability to establish wireless communications between the UEs 115, identifying neighboring ANs 210, transmitting the request 235, receiving the first control signaling 240-*a*, or any combination thereof. In some cases, the wireless devices may perform the directional learning procedure based on (e.g., in accordance with, or in response to) information which was included within the first control signaling 240-*a*. For example, as noted previously herein, the first control signaling 240-*a* may indicate a set of resources for performing the directional learning procedure. In this example, the AN 210-*a* and the respective UEs 115-*a*, 115-*b* may perform directional learning communications with one another within the indicated set of resources in order to perform the directional learning procedure.

By way of another example, the first control signaling 240-*a* may indicate a geographical position of the wireless devices, relative directions of the wireless devices relative to one another, or both. In this example, the AN 210-*a* and the respective UEs 115-*a*, 115-*b* may perform directional learning communications based on the indicated positions and/or directions. In particular, the wireless devices may utilize the indicated positions/direction to reduce a quantity of candidate beams (e.g., candidate directions) which should be swept through during the directional learning procedure.

In some cases, the UEs 115-*a*, 115-*b* may be configured to perform any number of directional learning procedures with any number of ANs 210 (and/or any number of ADs 220 controlled by ANs 210) based on an instruction received via the first control signaling 240-*a*. For example, in some cases, the UEs 115-*a*, 115-*b* may be configured to perform directional learning procedures with both the first AN 210-*a* and the second AN 210-*b*. In some cases, performing directional learning procedures with multiple ANs 210 may enable the UEs 115-*a*, 115-*b* and base station 105-*a* to identify an AN 210 which will result in improved wireless communications between the respective UEs 115. Moreover, in cases where an AN 210 may include multiple candidate ADs 220, the UEs 115-*a*, 115-*b* may be configured to perform directional learning procedures with each of the respective ADs 220.

In some aspects, the first UE 115-*a*, the AN 210-*a*, the second UE 115-*b*, or any combination thereof, may transmit an uplink message 245 to the base station 105-*a*, where the uplink message 245 includes an indication of a completion of the directional learning procedure performed with the AN 210-*a* (e.g., directional learning complete notification). For example, the first UE 115-*a* may transmit the uplink message 245, where the uplink message 245 indicates that a BPL was established at the AN 210-*a* with both the first UE 115-*a* and the second UE 115-*b*. In this regard, the respective wireless devices may transmit the uplink message 245 based on receiving the first control signaling 240-*a* at 425, performing the directional learning communications at 430, or both.

In some aspects, the uplink message 245 may include information associated with the directional learning procedure. Information included within the uplink message 245 may include, but is not limited to, relative directions/ positions of the respective wireless devices, preferred/non- preferred beams for wireless communications between the respective wireless devices (e.g., quasi co-location (QCL) assumption), indications of signal quality/strength associated with wireless communications between the respective wireless devices, or any combination thereof.

For example, in cases where the first UE 115-*a* transmits the uplink message 245, the uplink message 245 may include a measurement report associated with wireless communications between the first UE 115-*a* and the AN 210-*a*. The measurement report may indicate a signal strength and/or quality associated with wireless communications received from the AN 210-*a* during the directional learning procedure (e.g., RSRP, RSRQ, RSSI, SNR, SINR, CQI). By way of another example, in cases where the first UE 115-*a* transmits the uplink message 245, the uplink message 245 may indicate a QCL (e.g., QCL assumption) associated with the AN 210-*a*. In other cases, the uplink message 245 may include link configurations (e.g., AD link configurations) which will need to be swept/cycled through to create the assisted link between the UEs 115-*a*, 115-*b*.

As noted previously herein, the UEs 115-*a*, 115-*b* may be configured to perform any number of directional learning procedures with any number of ANs 210 based on an instruction received via the first control signaling 240-*a*. In this regard, the UEs 115-*a*, 115-*b* may be configured to transmit an uplink message 245 which indicates the completion of each completed directional learning procedure. For example, in cases where the first UE 115-*a* performs a first directional learning procedure with the first AN 210-*a* and a second directional learning procedure with the second AN 210-*b*, the first UE 115-*a* may be configured to transmit two separate uplink messages 245 indicating a completion of the two respective directional learning procedures. Additionally, or alternatively, the first UE 115-*a* may transmit a single uplink message 245 which jointly indicates the completion of the two respective directional learning procedures.

Moreover, in some aspects, the base station 105-*a* may indicate what information is or is not to be included within directional learning complete notifications (e.g., uplink message 245), as well as which wireless device(s) are (or are not) to transmit directional learning complete notifications. For example, the base station 105-*a* may indicate which measurements, beam information, AN/AD information (e.g., link configurations), or any combination thereof, is to be included within a directional learning complete notification (e.g., uplink message 245). In some cases, such indications may be communicated via the first control signaling 240-*a*. By way of another example, the base station 105-*a* may indicate that UEs 115 do not need to (e.g., are not expected to) transmit directional learning complete notifications, and may therefore indicate that only ANs 210 are expected to transmit directional learning complete notifications (e.g., uplink message 245).

In some aspects, the base station 105-*a* may be configured to select which AN 210 will be used to facilitate wireless communications between the first UE 115-*a* and the second UE 115-*b*. The base station 105-*a* may select which AN 210 will be used based on the uplink message 245(*s*) received at 435. In other words, upon receiving directional learning complete notifications for a given pair of UEs 115 (or group of UEs 115), the base station 105-*a* may be configured to determine a set of candidate ANs 210 which may be beneficial for the link(s) between the respective UEs 115.

For example, in cases where the base station 105-*a* receives multiple uplink messages 245 which indicate a completion of directional learning procedures performed with multiple candidate ANs 210, the base station 105-*a* may be configured to select which AN 210 (and/or which AD 220) will be used to facilitate wireless communications between the first UE 115-*a* and the second UE 115-*b*. In particular, the base station 105-*a* may be configured to select which AN 210 will be used to facilitate wireless communications between the first UE 115-*a* and the second UE 115-*b* based on information included within the uplink messages 245. In some cases, the base station 105-*a* may select the AN 210 which is geographically closest to the first UE 115-*a*, the second UE 115-*b*, or both. In other cases, the base station 105-*a* may be configured to select the AN 210 (e.g., AN 210-*a*) and/or AD 220 which exhibits the best signal strength and/or quality with the respective UEs 115-*a*, 115-*b*.

In some implementations, the base station 105-*a* may be configured to determine the total number of beam searches (e.g., beam search space) that a respective UE-AN-UE link may requires to establish a wireless communication link. The search space may be determined based on the link configuration indices (e.g., AD link configuration indices), the QCL assumptions at the UEs 115-*a*, 115-*b*, measurement reports received from the respective wireless devices (e.g., via uplink message 245), or any combination thereof.

The base station 105-*a* may transmit second control signaling 240-*b* to the first UE 115-*a*, the second UE 115-*b*, the AN 210-*a*, or any combination thereof. In some aspects, the second control signaling 240-*b* may indicate a set of resources for performing a link configuration procedure between the AN 210-*a* and the respective UEs 115-*a*, 115-*b* (e.g., node training indication). In some cases, the respective wireless devices (e.g., UEs 115-*a*, 115-*b*, AN 210-*a*) may receive, and the base station 105-*a* may transmit, the second control signaling 240-*b* based on transmitting/receiving the first control signaling 240-*a*, performing the directional learning procedure(s), transmitting/receiving the uplink message 245, selecting the AN 210-*a*, or any combination thereof.

In some aspects, the second control signaling 240-*b* may indicate which AN 210 (e.g., AN 210-*a*) (and corresponding AD 220) will be used to facilitate wireless communications between the respective UEs 115-*a*, 115-*b* (e.g., which AN 210 was selected by the base station 105-*a*). In some cases, the second control signaling 240-*b* may indicate a set of candidate link configurations at the AD 220 of the AN 210-*a* for facilitating wireless communications between the first UE 115-*a* and the second UE 115-*b*. The set of candidate link configurations may be included within a codebook of link configurations which are supported by the AD 220/AN 210-*a*.

For example, in cases where the AD 220 controlled by the AN 210-*a* includes a RIS with reflective elements, the second control signaling 240-*b* may indicate a set of candidate reflective coefficients or candidate reflective parameters which may be used to reflect signals between the UEs 115-*a*, 115-*b*. In some cases, the candidate link configurations which are indicated via the second control signaling 240-*b* may be determined (by the base station 105-*a*) based on the information included in the uplink message 245 (e.g., based on positions/directions of the wireless devices, based on an indicated QCL).

Moreover, in some cases, the second control signaling 240-*b* (e.g., training indication) may indicate a set of resources (e.g., training resources) which may be used to perform a link configuration procedure in order to train the respective links between the UEs 115-*a*, 115-*b* and the AN 210-*a*. For a given AN 210 or UE 115, each training resource (e.g., each set of training resources) may correspond to a beam/link configuration at the AD 220 of the corresponding AN 210 which was indicated in the uplink message 245 (e.g., directional learning complete notification). Further, the base station 105-*a* may provide alternate grants to the UEs 115-*a*, 115-*b* scheduled to transmit over these resources in the respective cell and/or sector. Additionally, in some cases, the second control signaling 240-*b* may also indicate a set of post-training resources which may be used after the link configuration procedure to determine the best assisted link after the beam training When multiple assisted sidelink connections are being established between respective UEs 115, the base station 105-*a* may determine a set of resources for the M assisted beam training procedures. Moreover, for each set of resources, and based on the received directional learning complete notifications (e.g., received uplink messages 245), the base station 105-*a* may configure the ANs 210 (e.g., AN 210-*a*) to use one or a set of link configurations (e.g., AD link configurations) during the link configuration procedure. If multiple links are being assisted by the same AN 210 (e.g., same AD 220), the base station 105-*a* may create a measurement pattern such that multiple pairs of UE 115 may use the same measurement instance to train their link during the respective link configuration procedures.

The first UE 115-*a*, the second UE 115-*b*, the AN 210-*a*, or any combination thereof, may be configured to perform a link configuration procedure. In particular, the UEs 115-*a*, 115-*b* and the AN 210-*a* may be configured to communicate with one another within the set of resources (e.g., training resources) for the link configuration procedure which were indicated via the second control signaling 240-*b*.

In some aspects, the respective wireless devices may be configured to perform the link configuration procedure (e.g., link training) in order to identify a link configuration which will be used at the AD 220 controlled by the AN 210-*a* to facilitate communications between the UEs 115-*a*, 115-*b*. As such, the wireless devices may perform the link configuration procedure in order to identify the link configuration of the AD 220 associated with the AN 210-*a* which will result in in more efficient and reliable wireless communications between the first UE 115-*a* and the second UE 115-*b*. In this regard, the wireless devices may perform the link configuration procedure by communicating in accordance with the candidate link configurations which were indicated via the second control signaling 240-*b*. As part of the link configuration procedure, the UEs 115-*a*, 115-*b* may provide feedback messages and/or measurement reports (e.g., CQI reports) which indicate a relative quality of wireless communications which are performed in accordance with each respective link configuration at the AN 210-*a*.

Subsequently, the first UE 115-*a* may communicate with the second UE 115-*b* via the AN 210-*a* (e.g., via one or more ADs 220 controlled by the AN 210-*a*). In other words, the AN 210-*a* may facilitate wireless communications between the UEs 115-*a*, 115-*b* by relaying, forwarding, reflecting, or otherwise communicating messages which are exchanged between the respective UEs 115-*a*, 115-*b* (e.g., by controlling the ADs 220 of the AN 210-*a*). In particular, the AN 210-*a* may facilitate the wireless communications between the UEs 115-*a*, 115-*b* in accordance the link configuration which was identified through the link configuration procedure. As such, the UEs 115-*a*, 115-*b* and the AN 210-*a* may be configured to perform the wireless communications based on receiving the second control signaling 240-*b*, performing the link configuration procedure (e.g., link training), or both.

Techniques described herein may enable improved establishment of wireless links via one or more ADs 220 controlled by the AN 210-*a*. In particular, techniques described herein may enable the base station 105-*a* to facilitate establishment of a sidelink communication link between the UEs 115-*a*, 115-*b* through the ANs 210-*a*, which may expedite the sidelink bearer establishment via the AN 210-*a*. In particular, the base station 105-*a* may provide information to the UEs 115 and AN 210-*a* which may enable the AN 210-*a* to sweep through fewer quantities of candidate beams and/or candidate link configurations, thereby expediting the establishment of wireless communications via the ANs 210-*a*. Moreover, information provided by the base station 105-*e* during establishment of the AN 210-*a* may enable the network to establish wireless connections between the UEs 115-*a*, 115-*b* via the AN 210-*a* which will result in more efficient and reliable wireless communications.

Figure 4:
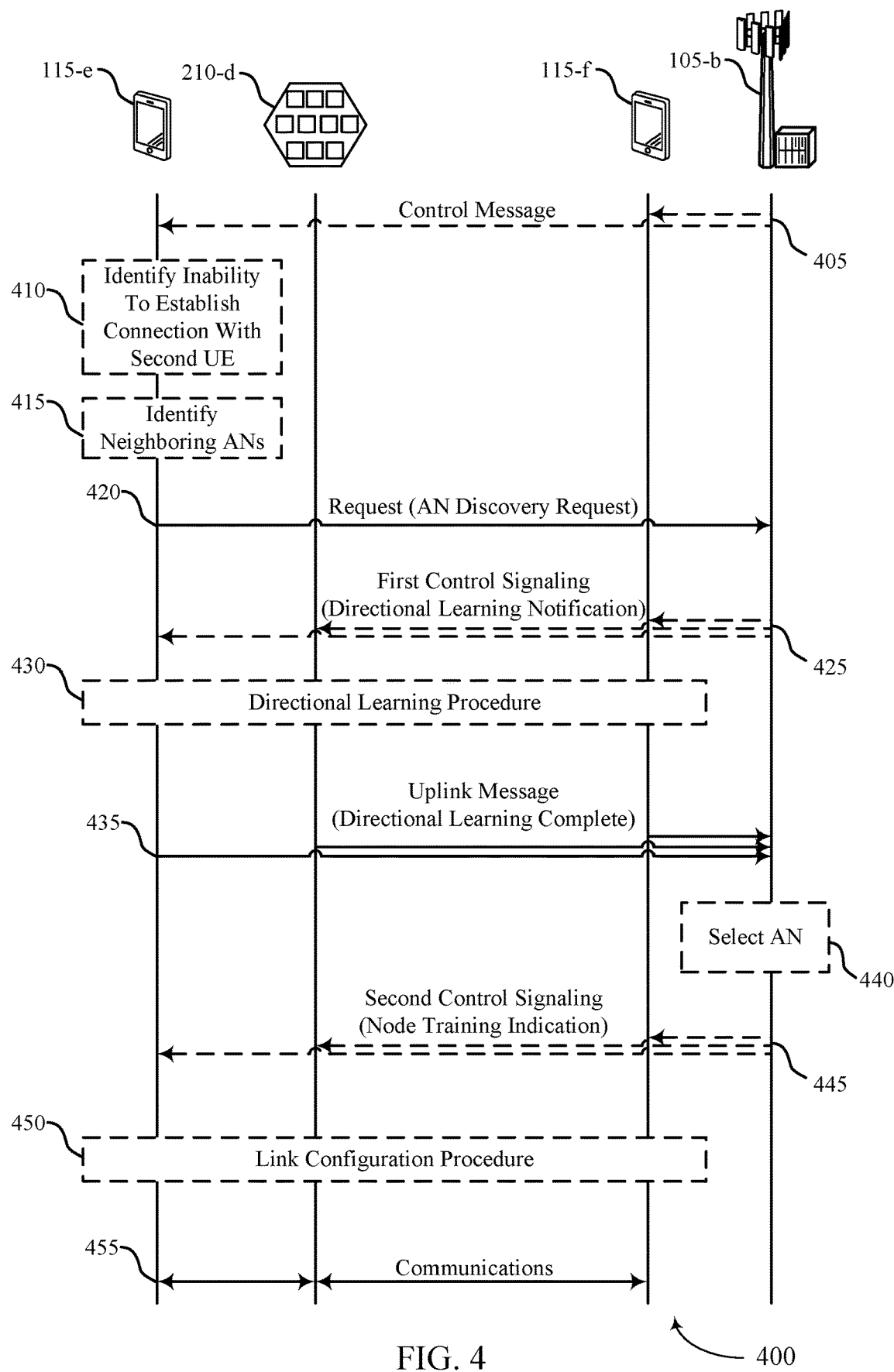
FIG. 4 illustrates an example of a process flow that supports techniques for assisted sidelink bearer establishment in accordance with aspects of the present disclosure.

FIG. 4 illustrates an example of a process flow 400 that supports techniques for assisted sidelink bearer establishment in accordance with aspects of the present disclosure. In some examples, process flow 400 may implement, or be implemented by, aspects of wireless communications system 100, wireless communications system 200, directional learning procedure 400, or any combination thereof. In particular, the process flow 400 illustrates techniques for assisted link/bearer establishment with ANs. For example, the process flow 400 may illustrate a first UE 115-*e* transmitting an AN discovery request to a base station 105-*b*, performing a directional learning procedure with an AN 405 based on first control signaling received from the base station 105-*b*, transmitting an indication of a completion of the directional learning procedure, performing a link configuration procedure with the AN 405 based on second control signaling received from the base station 105-*b*, and communicating with a second UE 115-*f* via one or more ADs controlled by the AN 405 based on the link configuration procedure, as described with reference to FIGS. 1-3, among other aspects.

The process flow 400 may include a first UE 115-*e*, a second UE 115-*f*, an AN 210-*d*, and a base station 105-*c*, which may be examples of UEs 115, ANs 210, and base stations 105, as described with reference to FIGS. 1-3.

In some examples, the operations illustrated in process flow 400 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 405, the base station 105-*b* may transmit a control message to the first UE 115-*e*, the second UE 115-*f*, or both, where the control message indicates one or more parameters or characteristics for establishing wireless links with ANs 210-*d* (e.g., AN 210-*d*). For example, in some cases, the control message may indicate a set of resources for transmitting requests to the base station 105-*b* for establishing wireless connections between wireless devices via ANs 210 (e.g., AN discovery requests). For instance, the control message may indicate a periodicity of a set of transmission occasions which the UEs 115 may use to transmit requests to the base station 105-*b* for assisted AN link establishment. The control message my include, but is not limited to, an RRC message, a DCI message, a MAC-CE message, or any combination thereof.

At 410, the first UE 115-*e* may identify that it is unable to establish a sidelink communication link with the second UE 115-*f*. In other words, the UE 115-*e* may identify that it is unable to establish a direct sidelink data bearer with the second UE 115-*f*.

At 415, the first UE 115-*e* may identify one or more neighboring (e.g., surrounding) ANs 210, including the AN 210-*d*. In other words, the UE 115-*e* may identify one or more ANs 210 (and corresponding ADs 220) which are within a range (e.g., pre-defined range) of the first UE 115-*e*. In some aspects, the first UE 115-*e* may identify the one or more neighboring ANs 210 based on being unable to establish a wireless connection with the second UE 115-*f* at 410. The first UE 115-*e* may identify the one or more neighboring ANs 210 at 415 using any techniques, including transmission of AN discovery messages, reception of messages from neighboring ANs 210, or both.

At 420 the first UE 115-*e* may transmit a request for the base station 105-*b* to establish a wireless communication link between the first UE 115-*e* and the second UE 115-*f* via at least one AD 220 controlled by at least one AN 210 (e.g., AN 210-*d*). In other words, the first UE 115-*e* may transmit an AN discovery request for the base station 105-*b* to assist with establishing a wireless connection with the second UE 115-*f* via one or more ADs 220 controlled by one or more ANs 210. In some aspects, the request may include an indication of the second UE 115-*f*, the identified neighboring ANs 210, or both.

The first UE 115-*e* may transmit the request at 420 based on receiving the control message at 405, identifying the inability to establish a wireless connection with the second UE 115-*f* at 410, identifying neighboring ANs 210 at 415, or any combination thereof. For example, in some implementations, the first UE 115-*e* may transmit the request within a set of resources which were allocated for AN discovery requests via the control message at 405. For instance, the first UE 115-*e* may transmit the request within a transmission occasion for communicating AN discovery requests which were configured via the control message at 405.

In some aspects, the request may include information or parameters associated with the second first UE 115-*e*, the second UE 115-*b*, neighboring ANs 210, or any combination thereof. Information associated with the respective wireless devices may help the base station 105-*b* establish wireless communications between the UEs 115-*e*, 115-*f* via an AN210. For example, the request may include one or more parameters associated with the second UE 115-*f*, including a destination identifier, a peer L2 identifier, a geographical location, a sidelink zone identifier, a cell identifier, a type of communication service to be established with the second UE 115-*f*, or any combination thereof. For instance, the request may indicate geographical positions of the first UE 115-*e*, the second UE 115-*b*, or both, such that the base station 105-*b* may more efficiently identify ANs 210 which may facilitate communications between the respective UEs 115-*e*, 115-*f*.

Additionally, or alternatively, the request may include information associated with the neighboring ANs 210 which were identified at 410. Information associated with each respective neighboring AN 210 (e.g., AN 210-*a*) which may be included within the request may include, but is not limited to, a geographical position of each respective neighboring AN 210, a distance between the first UE 115-*e* and each neighboring AN 210, a signal strength metric associated with signals received from each respective neighboring AN 210 (e.g., RSRP, RSSI), a signal quality metric associated with signals received from each respective neighboring AN 210 (e.g., RSRQ, SNR, SINR, CQI), or any combination thereof.

At 425, the base station 105-*b* may transmit first control signaling to the first UE 115-*e*, the second UE 115-*f*, the AN 210-*d*, or any combination thereof. In some aspects, the first control signaling may include an indication for the first UE 115-*e*, the second UE 115-*b*, or both, to perform a directional learning procedure with one or more ANs 210 (e.g., directional learning notification), as shown and described via the directional learning procedure 300 illustrated in FIG. 3.

For example, the first control signaling may indicate for the AN 210-*d* to perform a directional learning procedure with the first UE 115-*e* and the second UE 115-*f*. In some implementations, the first control signaling may indicate for the first and second UEs 115-*e*, 115-*f* to perform directional learning procedures with multiple candidate ANs 210 and/or multiple candidate ADs 220. The first control signaling may include an RRC message, a DCI message, a MAC-CE message, or any combination thereof. In some aspects, the base station 105-*b* may transmit the first control signaling based on (e.g., in response to) receiving the request (e.g., AN discovery request) at 420.

In some aspects, the first control signaling may include information which may assist the respective wireless devices (e.g., first UE 115-*e*, second UE 115-*f*, AN 210-*d*, corresponding AD 220) to perform the directional learning procedure. Information which may be included within the first control signaling may include, but is not limited to, a set of resources (e.g., time resources, frequency resources, spatial resources) for performing the directional learning procedure, a position of the respective wireless devices (e.g., geographical positions and/or directions of the UEs 115-*e*, 115-*f* and AN 210-*d* relative to one another), and the like. For example, the first control signaling may indicate time/frequency resource in which the respective wireless devices are to perform the directional learning procedure. By way of another example, the first control signaling may indicate geographical positions and/or relative directions of the of the respective wireless devices to facilitate a more efficient and directional learning procedure. In particular, as described with reference to FIG. 3, the inclusion of geographical positions/relative directions of the respective wireless devices may reduce a quantity of beams and/or link configurations over which the AN 210-*d* is required to sweep through during the directional learning procedure.

At 430, the first UE 115-*e*, the second UE 115-*f*, the AN 210-*d*, or any combination thereof, may be configured to perform a directional learning procedure. In particular, as described with reference to FIG. 3, the respective wireless devices may be configured to perform the directional learning procedure in order to determine one or more beams (e.g., one or more directions) which will be used for wireless communications between the AN 210-*d* and the respective UEs 115-*e*, 115-*f*. In this regard, the respective wireless devices may perform directional learning communications in which the respective wireless devices sweep through candidate beams and/or beam pairs (e.g., Tx/Rx beam pairs) to identify beams and relative directions between the respective wireless devices.

In some aspects, the wireless devices (e.g., first UE 115-*e*, second UE 115-*f*, AN 210-*d*) may perform the directional learning procedure at 430 based on receiving the control message at 405, identifying the inability to establish wireless communications at 410, identifying neighboring ANs 210 at 415, transmitting the request at 420, receiving the first control signaling at 425, or any combination thereof. In some cases, the wireless devices may perform the directional learning procedure based on (e.g., in accordance with, or in response to) information which was included within the first control signaling. For example, as noted previously herein, the first control signaling may indicate a set of resources for performing the directional learning procedure. In this example, the AN 210-*d* and the respective UEs 115-*e*, 115-*f* may perform directional learning communications with one another within the indicated set of resources in order to perform the directional learning procedure at 430. By way of another example, the first control signaling may indicate a geographical position of the wireless devices, relative directions of the wireless devices relative to one another, or both. In this example, the AN 210-*d* and the respective UEs 115-*e*, 115-*f* may perform directional learning communications based on the indicated positions and/or directions. In particular, the wireless devices may utilize the indicated positions/direction to reduce a quantity of candidate beams (e.g., candidate directions) which should be swept through during the directional learning procedure.

While FIG. 4, illustrates the first UE 115-*e* and the second UE 115-*f* performing a single directional learning procedure with a single AN 210, this is not to be regarded as a limitation of the present disclosure. In particular, the UEs 115-*e*, 115-*f* may be configured to perform any number of directional learning procedures with any number of ANs 210 based on an instruction received via the first control signaling. As described previously herein, by performing directional learning procedures with multiple ANs 210, techniques described herein may enable the UEs 115-*e*, 115-*f* and base station 105-*b* to identify an AN 210 which will result in improved wireless communications between the respective UEs 115.

At 435, the first UE 115-*e*, the AN 210-*d*, the second UE 115-*f*, or any combination thereof, may transmit an uplink message to the base station 105-*b*, where the uplink message includes an indication of a completion of the directional learning procedure performed with the AN 210-*d* (e.g., directional learning complete notification). In this regard, the respective wireless devices may transmit the uplink message based on receiving the first control signaling at 425, performing the directional learning communications at 430, or both.

In some aspects, the uplink message may include information associated with the directional learning procedure. Information included within the uplink message may include, but is not limited to, relative directions/positions of the respective wireless devices, preferred/non-preferred beams for wireless communications between the respective wireless devices (e.g., QCL), indications of signal quality/strength associated with wireless communications between the respective wireless devices, or any combination thereof.

For example, in cases where the first UE 115-*e* transmits the uplink message, the uplink message may include a measurement report associated with wireless communications between the first UE 115-*e* and the AN 210-*d*. The measurement report may indicate a signal strength and/or quality associated with wireless communications received from the AN 210-*d* during the directional learning procedure (e.g., RSRP, RSRQ, RSSI, SNR, SINR, CQI). By way of another example, in cases where the first UE 115-*e* transmits the uplink message, the uplink message may indicate a QCL associated with the AN 210-*d*.

As noted previously herein, the UEs 115-*e*, 115-*f* may be configured to perform any number of directional learning procedures with any number of ANs 210/ADs 220 based on an instruction received via the first control signaling. In this regard, the UEs 115-*e*, 115-*f* may be configured to transmit an uplink message which indicates the completion of each completed directional learning procedure. For example, in cases where the first UE 115-*e* performs three separate directional learning procedures with three separate ANs 210, the first UE 115-*e* may be configured to transmit three separate uplink messages indicating a completion of the three respective directional learning procedures. Additionally, or alternatively, the first UE 115-*e* may transmit a single uplink message which jointly indicates the completion of the three respective directional learning procedures.

At 440, the base station 105-*b* may be configured to select which AN 210 (and/or which AD 220) will be used to facilitate wireless communications between the first UE 115-*e* and the second UE 115-*b*. The base station 105-*b* may select which AN 210 will be used based on the uplink message(s) received at 435.

For example, in cases where the base station 105-*b* receives multiple uplink messages which indicate a completion of directional learning procedures performed with multiple candidate ANs 210, the base station 105-*b* may be configured to select which AN 210 and/or AD 220 will be used to facilitate wireless communications between the first UE 115-*e* and the second UE 115-*b*. In particular, the base station 105-*b* may be configured to select which AN 210 will be used to facilitate wireless communications between the first UE 115-*e* and the second UE 115-*b* based on information included within the uplink messages. In some cases, the base station 105-*b* may select the AN 210 which is geographically closest to the first UE 115-*e*, the second UE 115-*b*, or both. In other cases, the base station 105-*b* may be configured to select the AN 210 (e.g., AN 210-*d*) which exhibits the best signal strength and/or quality with the respective UEs 115-*e*, 115-*f*.

At 445, the base station 105-*b* may transmit second control signaling to the first UE 115-*e*, the second UE 115-*f*, the AN 210-*d*, or any combination thereof. In some aspects, the second control signaling may indicate a set of resources for performing a link configuration procedure between the AN 210-*d* and the respective UEs 115-*e*, 115-*f* (e.g., node training indication). In some cases, the respective wireless devices (e.g., UEs 115-*e*, 115-*f*, AN 210-*d*) may receive, and the base station 105-*b* may transmit, the second control signaling at 445 based on transmitting/receiving the first control signaling at 425, performing the directional learning procedure(s) at 430, transmitting/receiving the uplink message at 435, selecting the AN 210-*d* at 440, or any combination thereof.

In some aspects, the second control signaling may indicate which AN 210 (e.g., AN 210-*d*) will be used to facilitate wireless communications between the respective UEs 115-*e*, 115-*f* (e.g., which AN 210 was selected by the base station 105-*b* at 440). In some cases, the second control signaling may indicate a set of candidate link configurations for ADs 220 controlled by the AN 210-*d* for facilitating wireless communications between the first UE 115-*e* and the second UE 115-*f*. The set of candidate link configurations may be included within a codebook of link configurations which are supported by one or more ADs 220 associated with the AN 210-*d*.

For example, in cases where the AN 210-*d* includes a RIS (e.g., AD 220) with reflective elements, the second control signaling may indicate a set of candidate reflective coefficients or candidate reflective parameters which may be used to reflect signals between the UEs 115-*e*, 115-*f*. In some cases, the candidate link configurations which are indicated via the second control signaling may be determined (by the base station 105-*b*) based on the information included in the uplink message at 435 (e.g., based on positions/directions of the wireless devices, based on an indicated QCL).

At 450, the first UE 115-*e*, the second UE 115-*f*, the AN 210-*d*, or any combination thereof, may be configured to perform a link configuration procedure. In particular, the UEs 115-*e*, 115-*f* and the AN 210-*d* may be configured to communicate with one another within the set of resources for the link configuration procedure which were indicated via the second control signaling at 445.

In some aspects, the respective wireless devices may be configured to perform the link configuration procedure at 450 in order to identify a link configuration which will be used at the AN 210-*d* to facilitate communications between the UEs 115-*e*, 115-*f*. As such, the wireless devices may perform the link configuration procedure in order to identify the link configuration procedure at the AN 210-*d* which will result in in more efficient and reliable wireless communications between the first UE 115-*e* and the second UE 115-*f*. In this regard, the wireless devices may perform the link configuration procedure by communicating in accordance with the candidate link configurations which were indicated via the second control signaling at 445. As part of the link configuration procedure, the UEs 115-*e*, 115-*f* may provide feedback messages and/or measurement reports (e.g., CQI reports) which indicate a relative quality of wireless communications which are performed in accordance with each respective link configuration at the AN 210-*d*.

For example, in some aspects, the UEs 115-*e* and 115-*f* may be configured to communicate with one another by sweeping over the plurality of beams determined during the directional learning procedure within the set of resources while the AN 210-*d* sweeps across AD configurations (e.g., link configurations) based on the directional learning procedure for the link configuration procedure which is indicated via the second control signaling at 445. The sweep patterns (e.g., the sequence of beam configurations or AD/link configurations) at the UEs 115 and the AD 220 of the AN 210-*d* may be pre-configured, indicated by the base station 105-*b* (e.g., via the second control signaling at 445), or both.

At 455, the first UE 115-*f* may communicate with the second UE 115-*f* via the one or more ADs 220 controlled by the AN 210-*d*. In other words, the AN 210-*d* may facilitate wireless communications between the UEs 115-*e*, 115-*f* via one or more ADs 220 by relaying, forwarding, reflecting, or otherwise communicating messages which are exchanged between the respective UEs 115-*e*, 115-*f*. In particular, the AN 210-*d* may facilitate the wireless communications between the UEs 115-*e*, 115-*f* in accordance the link configuration which was identified through the link configuration procedure at 450. As such, the UEs 115-*e*, 115-*f* and the AN 210-*d* may be configured to perform the wireless communications at 455 based on receiving the second control signaling at 445, performing the link configuration procedure at 450, or both.

Techniques described herein may enable improved establishment of wireless links via the AN 210-*d*. In particular, techniques described herein may enable the base station 105-*b* to facilitate establishment of a sidelink communication link between the UEs 115-*e*, 115-*f* through the ANs 210-*d*, which may expedite the sidelink bearer establishment via the AN 210-*d*. In particular, the base station 105-*b* may provide information to the UEs 115 and AN 210-*d* which may enable the AN 210-*d* to sweep through fewer quantities of candidate beams and/or candidate link configurations, thereby expediting the establishment of wireless communications via the ANs 210-*d*. Moreover, information provided by the base station 105-*e* during establishment of the AN 210-*d* may enable the network to establish wireless connections between the UEs 115-*e*, 115-*f* via the AN 210-*d* which will result in more efficient and reliable wireless communications.

Figure 5:
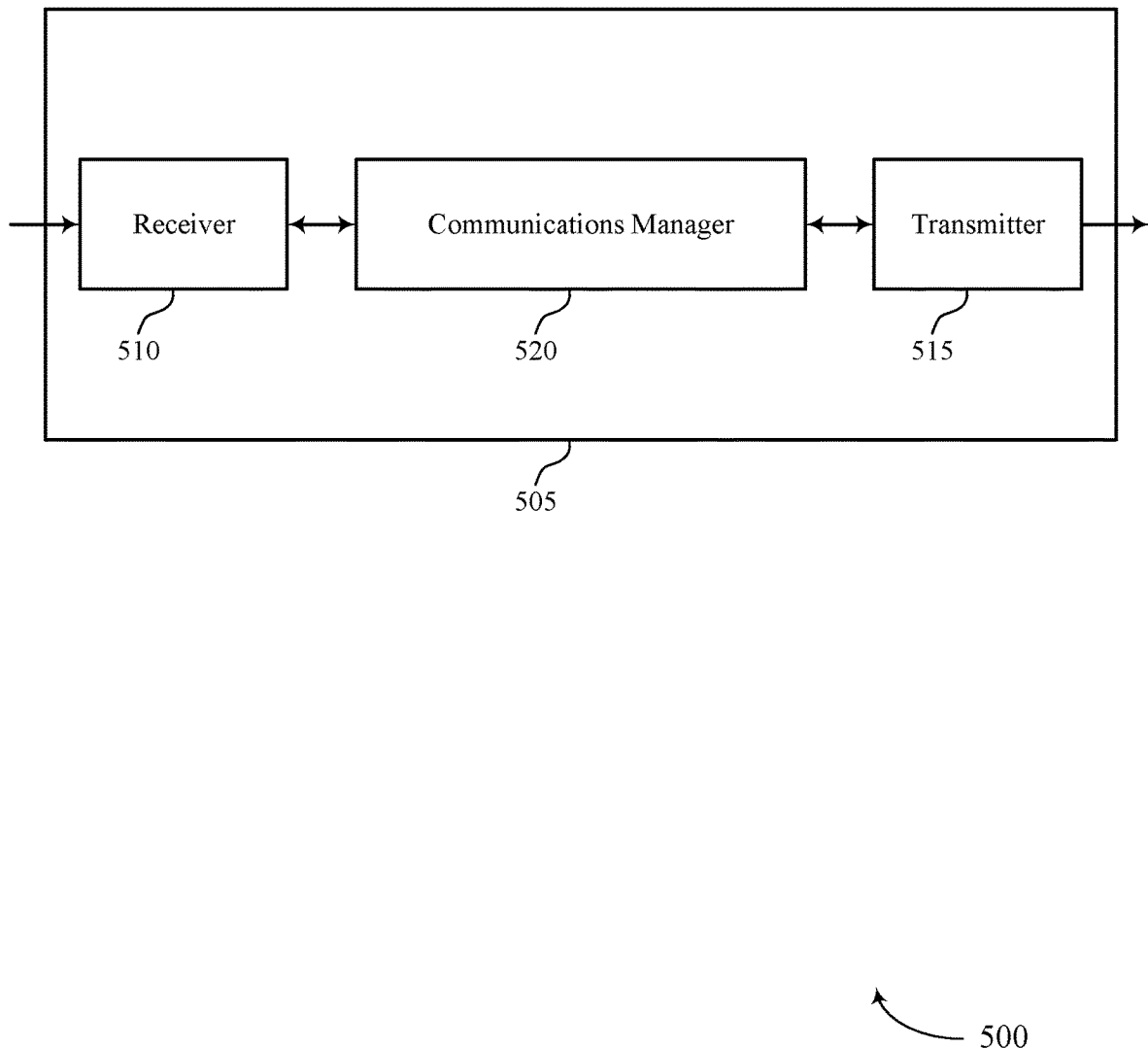
FIGS. 5 and 6 show block diagrams of devices that support techniques for assisted sidelink bearer establishment in accordance with aspects of the present disclosure.

FIG. 5 shows a block diagram 500 of a device 505 that supports techniques for assisted sidelink bearer establishment in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for assisted sidelink bearer establishment). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for assisted sidelink bearer establishment). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for assisted sidelink bearer establishment as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first UE in accordance with examples as disclosed herein. For example, the communications manager 520 may be configured as or otherwise support a means for transmitting, to a base station, a request for the base station to establish a wireless communication link between the first UE and a second UE via at least one AN. The communications manager 520 may be configured as or otherwise support a means for receiving, from the base station in response to the request, first control signaling including an indication for the first UE to perform a directional learning procedure with an AN. The communications manager 520 may be configured as or otherwise support a means for transmitting, to the base station and based on the first control signaling, an uplink message including an indication of a completion of the directional learning procedure performed with the AN. The communications manager 520 may be configured as or otherwise support a means for receiving, from the base station in response to the uplink message, second control signaling indicating a set of resources for performing a link configuration procedure between the first UE and the AN. The communications manager 520 may be configured as or otherwise support a means for communicating with the second UE via the AN based on the second control signaling.

Additionally or alternatively, the communications manager 520 may support wireless communication at an AN in accordance with examples as disclosed herein. For example, the communications manager 520 may be configured as or otherwise support a means for receiving, from the base station in response to a request for the base station to establish a wireless communication link between a first UE and a second UE via the AN, first control signaling including an indication for the AN to perform a directional learning procedure with the first UE. The communications manager 520 may be configured as or otherwise support a means for transmitting, to the base station and based on the first control signaling, an uplink message including an indication of a completion of the directional learning procedure performed with the first UE. The communications manager 520 may be configured as or otherwise support a means for receiving, from the base station in response to the uplink message, second control signaling indicating a set of resources for performing a link configuration procedure between the first UE and the AN. The communications manager 520 may be configured as or otherwise support a means for communicating with the first UE and the second UE based on the second control signaling.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for improved establishment of wireless links via ANs 210. In particular, techniques described herein may enable the base stations 105 to facilitate establishment of sidelink communication links between UEs 115 through ANs 210, which may expedite the sidelink bearer establishment via the ANs 210. In particular, base stations 105 may provide information to the UEs 115 and ANs 210 which may enable the ANs 210 to sweep through fewer quantities of candidate beams and/or candidate link configurations, thereby expediting the establishment of wireless communications via the ANs 210. Moreover, information provided by the base stations 105 during establishment of the ANs 210 may enable the network to establish wireless connections between UEs 115 via ANs 210 which will result in more efficient and reliable wireless communications.

Figure 6:
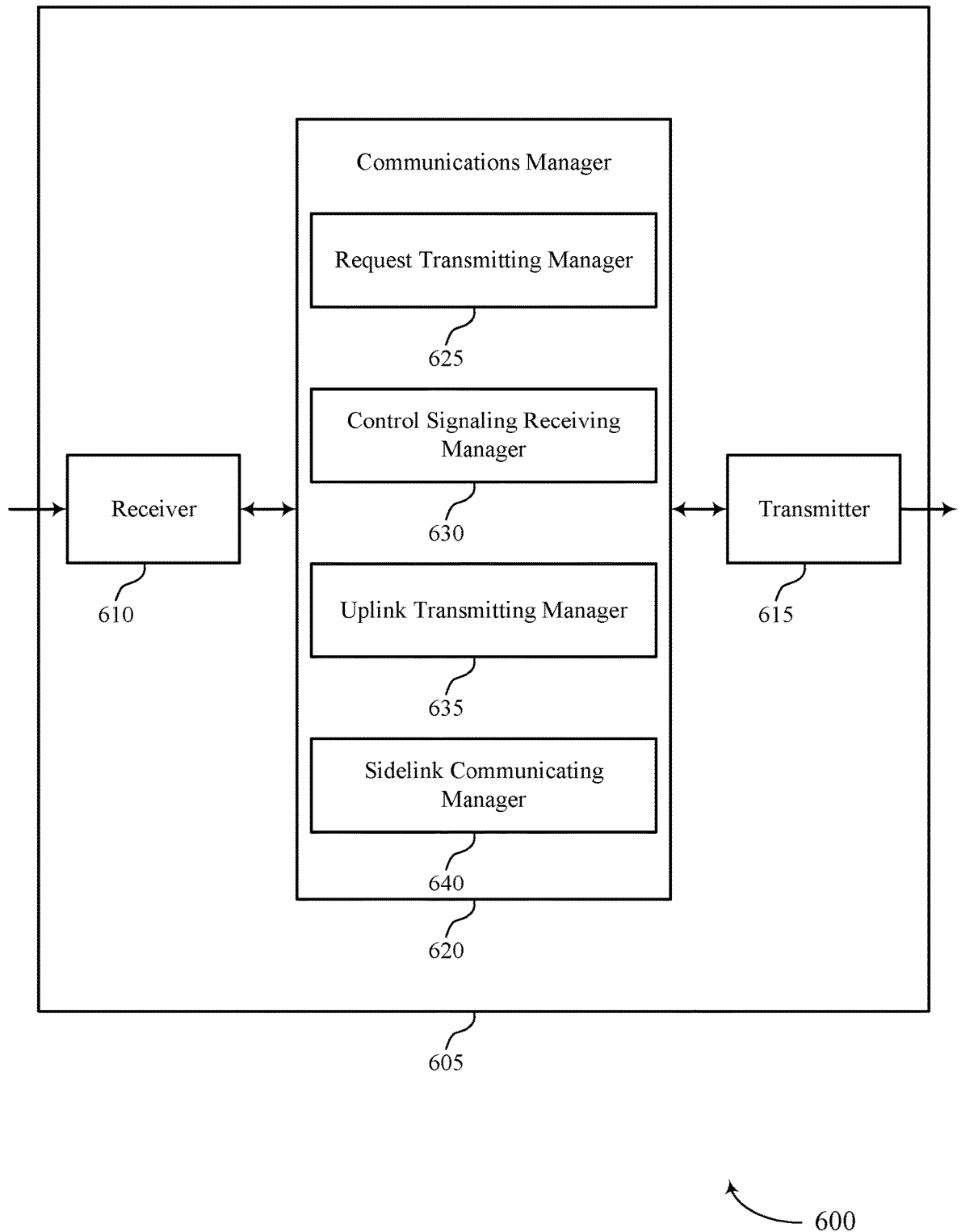

FIG. 6 shows a block diagram 600 of a device 605 that supports techniques for assisted sidelink bearer establishment in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for assisted sidelink bearer establishment). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for assisted sidelink bearer establishment). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for assisted sidelink bearer establishment as described herein. For example, the communications manager 620 may include a request transmitting manager 625, a control signaling receiving manager 630, an uplink transmitting manager 635, a sidelink communicating manager 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first UE in accordance with examples as disclosed herein. The request transmitting manager 625 may be configured as or otherwise support a means for transmitting, to a base station, a request for the base station to establish a wireless communication link between the first UE and a second UE via at least one AN. The control signaling receiving manager 630 may be configured as or otherwise support a means for receiving, from the base station in response to the request, first control signaling including an indication for the first UE to perform a directional learning procedure with an AN. The uplink transmitting manager 635 may be configured as or otherwise support a means for transmitting, to the base station and based on the first control signaling, an uplink message including an indication of a completion of the directional learning procedure performed with the AN. The control signaling receiving manager 630 may be configured as or otherwise support a means for receiving, from the base station in response to the uplink message, second control signaling indicating a set of resources for performing a link configuration procedure between the first UE and the AN. The sidelink communicating manager 640 may be configured as or otherwise support a means for communicating with the second UE via the AN based on the second control signaling.

Additionally or alternatively, the communications manager 620 may support wireless communication at an AN in accordance with examples as disclosed herein. The control signaling receiving manager 630 may be configured as or otherwise support a means for receiving, from the base station in response to a request for the base station to establish a wireless communication link between a first UE and a second UE via the AN, first control signaling including an indication for the AN to perform a directional learning procedure with the first UE. The uplink transmitting manager 635 may be configured as or otherwise support a means for transmitting, to the base station and based on the first control signaling, an uplink message including an indication of a completion of the directional learning procedure performed with the first UE. The control signaling receiving manager 630 may be configured as or otherwise support a means for receiving, from the base station in response to the uplink message, second control signaling indicating a set of resources for performing a link configuration procedure between the first UE and the AN. The sidelink communicating manager 640 may be configured as or otherwise support a means for communicating with the first UE and the second UE based on the second control signaling.

Figure 7:
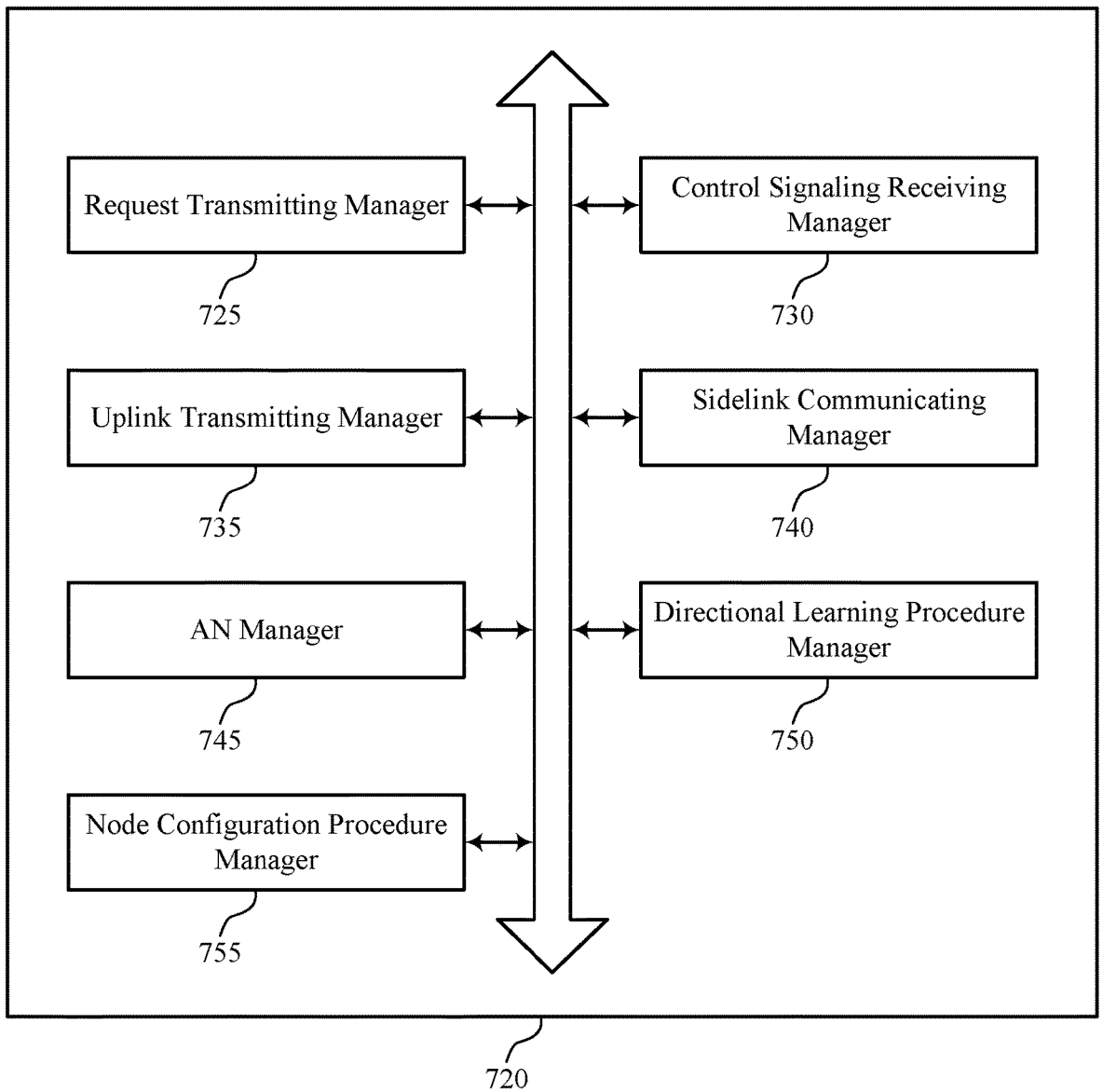
FIG. 7 shows a block diagram of a communications manager that supports techniques for assisted sidelink bearer establishment in accordance with aspects of the present disclosure.

FIG. 7 shows a block diagram 700 of a communications manager 720 that supports techniques for assisted sidelink bearer establishment in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for assisted sidelink bearer establishment as described herein. For example, the communications manager 720 may include a request transmitting manager 725, a control signaling receiving manager 730, an uplink transmitting manager 735, a sidelink communicating manager 740, an AN manager 745, a directional learning procedure manager 750, a link configuration procedure manager 755, or any combination thereof. Each of these components may communicate, directly or indirectly, with one another (e.g., via one or more buses).

The communications manager 720 may support wireless communication at a first UE in accordance with examples as disclosed herein. The request transmitting manager 725 may be configured as or otherwise support a means for transmitting, to a base station, a request for the base station to establish a wireless communication link between the first UE and a second UE via at least one AN. The control signaling receiving manager 730 may be configured as or otherwise support a means for receiving, from the base station in response to the request, first control signaling including an indication for the first UE to perform a directional learning procedure with an AN. The uplink transmitting manager 735 may be configured as or otherwise support a means for transmitting, to the base station and based on the first control signaling, an uplink message including an indication of a completion of the directional learning procedure performed with the AN. In some examples, the control signaling receiving manager 730 may be configured as or otherwise support a means for receiving, from the base station in response to the uplink message, second control signaling indicating a set of resources for performing a link configuration procedure between the first UE and the AN. The sidelink communicating manager 740 may be configured as or otherwise support a means for communicating with the second UE via the AN based on the second control signaling.

In some examples, the request transmitting manager 725 may be configured as or otherwise support a means for transmitting, via the request, an indication of one or more parameters associated with the second UE, where receiving the first control signaling is based on the indication of the one or more parameters.

In some examples, the one or more parameters include a destination identifier associated with the second UE, a peer L2 identifier associated with the second UE, a geographical location of the second UE, a sidelink zone identifier associated with the second UE, a cell identifier associated with the second UE, a type of communication service to be established with the second UE, or any combination thereof.

In some examples, the AN manager 745 may be configured as or otherwise support a means for identifying one or more ANs which are within a range of the first UE. In some examples, the request transmitting manager 725 may be configured as or otherwise support a means for transmitting, via the request, an indication of the one or more identified ANs, where receiving the first control signaling is based on transmitting the indication of the one or more identified ANs.

In some examples, the request transmitting manager 725 may be configured as or otherwise support a means for transmitting, via the request, information associated with each AN of the one or more identified ANs, where the information includes a distance between the first UE and each respective AN, a signal strength metric associated with signals received from each respective AN, a signal quality metric associated with signals received from each respective AN, or any combination thereof, where receiving the first control signaling is based on the information associated with each AN.

In some examples, the control signaling receiving manager 730 may be configured as or otherwise support a means for receiving, from the base station, an indication of a set of multiple transmission occasions associated with a periodicity, the set of multiple transmission occasions configured for communicating requests for the base station to establish wireless connections between wireless devices via ANs, where the request is transmitted within a transmission occasion of the set of multiple transmission occasions.

In some examples, the request transmitting manager 725 may be configured as or otherwise support a means for transmitting the request to the base station based on the first UE being unable to establish a sidelink communication link with the second UE.

In some examples, the control signaling receiving manager 730 may be configured as or otherwise support a means for receiving, via the first control signaling, an indication of an additional set of resources for performing the directional learning procedure with the AN. In some examples, the directional learning procedure manager 750 may be configured as or otherwise support a means for performing directional learning communications with the AN within the additional set of resources to perform the directional learning procedure, where transmitting the uplink message is based on the performance of the directional learning communications.

In some examples, the control signaling receiving manager 730 may be configured as or otherwise support a means for receiving, via the first control signaling, an indication of a position of the AN, a direction of the AN relative to the first UE, or both. In some examples, the directional learning procedure manager 750 may be configured as or otherwise support a means for performing directional learning communications with the AN based on the position, the direction, or both, where transmitting the uplink message is based on the performance of the directional learning communications.

In some examples, the uplink transmitting manager 735 may be configured as or otherwise support a means for transmitting, via the uplink message, a measurement report associated with wireless communications between the first UE and the AN, a QCL associated with the AN, or both, where receiving the second control signaling is based on the measurement report, the QCL, or both.

In some examples, the link configuration procedure manager 755 may be configured as or otherwise support a means for communicating with the AN within the set of resources for the link configuration procedure in accordance with a set of multiple link configurations at the AN, where communicating with the second UE via the AN includes communicating in accordance with a link configuration of the set of multiple link configurations.

In some examples, the control signaling receiving manager 730 may be configured as or otherwise support a means for receiving, via the second control signaling, an indication of the set of multiple link configurations.

Additionally or alternatively, the communications manager 720 may support wireless communication at an AN in accordance with examples as disclosed herein. In some examples, the control signaling receiving manager 730 may be configured as or otherwise support a means for receiving, from the base station in response to a request for the base station to establish a wireless communication link between a first UE and a second UE via the AN, first control signaling including an indication for the AN to perform a directional learning procedure with the first UE. In some examples, the uplink transmitting manager 735 may be configured as or otherwise support a means for transmitting, to the base station and based on the first control signaling, an uplink message including an indication of a completion of the directional learning procedure performed with the first UE. In some examples, the control signaling receiving manager 730 may be configured as or otherwise support a means for receiving, from the base station in response to the uplink message, second control signaling indicating a set of resources for performing a link configuration procedure between the first UE and the AN. In some examples, the sidelink communicating manager 740 may be configured as or otherwise support a means for communicating with the first UE and the second UE based on the second control signaling.

In some examples, the control signaling receiving manager 730 may be configured as or otherwise support a means for receiving, via the first control signaling, an indication of an additional set of resources for performing the directional learning procedure with the first UE. In some examples, the directional learning procedure manager 750 may be configured as or otherwise support a means for performing directional learning communications with the first UE within the additional set of resources to perform the directional learning procedure, where transmitting the uplink message is based on the performance of the directional learning communications.

In some examples, the control signaling receiving manager 730 may be configured as or otherwise support a means for receiving, via the first control signaling, an indication of a position of the first UE, a first direction of the first UE relative to the AN, or both. In some examples, the directional learning procedure manager 750 may be configured as or otherwise support a means for performing directional learning communications with the first UE based on the position, the direction, or both, where transmitting the uplink message is based on the performance of the directional learning communications.

In some examples, the uplink transmitting manager 735 may be configured as or otherwise support a means for transmitting, via the uplink message, a measurement report associated with wireless communications between the first UE and the AN, a QCL associated with the AN, or both, where receiving the second control signaling is based on the measurement report, the QCL, or both.

In some examples, the link configuration procedure manager 755 may be configured as or otherwise support a means for communicating with the first UE within the set of resources for the link configuration procedure in accordance with a set of multiple link configurations at the AN, where communicating with the first UE and the second UE includes communicating in accordance with a link configuration of the set of multiple link configurations.

In some examples, the control signaling receiving manager 730 may be configured as or otherwise support a means for receiving, via the second control signaling, an indication of the set of multiple link configurations.

Figure 8:
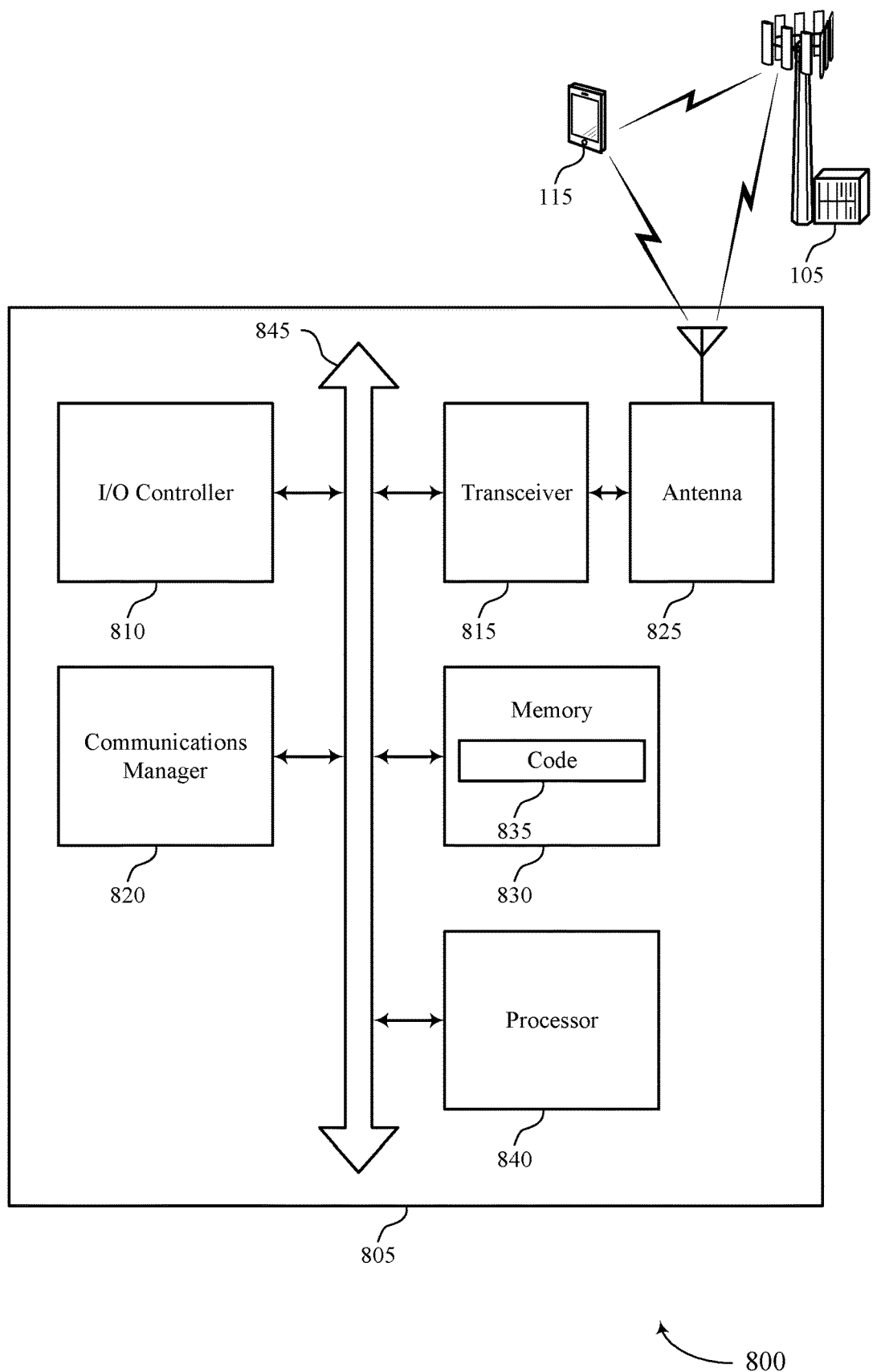
FIG. 8 shows a diagram of a system including a device that supports techniques for assisted sidelink bearer establishment in accordance with aspects of the present disclosure.

FIG. 8 shows a diagram of a system 800 including a device 805 that supports techniques for assisted sidelink bearer establishment in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for assisted sidelink bearer establishment). For example, the device 805 or a component of the device 805 may include a processor 840 and memory 830 coupled to the processor 840, the processor 840 and memory 830 configured to perform various functions described herein.

The communications manager 820 may support wireless communication at a first UE in accordance with examples as disclosed herein. For example, the communications manager 820 may be configured as or otherwise support a means for transmitting, to a base station, a request for the base station to establish a wireless communication link between the first UE and a second UE via at least one AN. The communications manager 820 may be configured as or otherwise support a means for receiving, from the base station in response to the request, first control signaling including an indication for the first UE to perform a directional learning procedure with an AN. The communications manager 820 may be configured as or otherwise support a means for transmitting, to the base station and based on the first control signaling, an uplink message including an indication of a completion of the directional learning procedure performed with the AN. The communications manager 820 may be configured as or otherwise support a means for receiving, from the base station in response to the uplink message, second control signaling indicating a set of resources for performing a link configuration procedure between the first UE and the AN. The communications manager 820 may be configured as or otherwise support a means for communicating with the second UE via the AN based on the second control signaling.

Additionally or alternatively, the communications manager 820 may support wireless communication at an AN in accordance with examples as disclosed herein. For example, the communications manager 820 may be configured as or otherwise support a means for receiving, from the base station in response to a request for the base station to establish a wireless communication link between a first UE and a second UE via the AN, first control signaling including an indication for the AN to perform a directional learning procedure with the first UE. The communications manager 820 may be configured as or otherwise support a means for transmitting, to the base station and based on the first control signaling, an uplink message including an indication of a completion of the directional learning procedure performed with the first UE. The communications manager 820 may be configured as or otherwise support a means for receiving, from the base station in response to the uplink message, second control signaling indicating a set of resources for performing a link configuration procedure between the first UE and the AN. The communications manager 820 may be configured as or otherwise support a means for communicating with the first UE and the second UE based on the second control signaling.

By including or configuring the communications manager 820 in accordance with examples as described herein, the device 805 may support techniques for improved establishment of wireless links via ANs 210. In particular, techniques described herein may enable the base stations 105 to facilitate establishment of sidelink communication links between UEs 115 through ANs 210, which may expedite the sidelink bearer establishment via the ANs 210. In particular, base stations 105 may provide information to the UEs 115 and ANs 210 which may enable the ANs 210 to sweep through fewer quantities of candidate beams and/or candidate link configurations, thereby expediting the establishment of wireless communications via the ANs 210. Moreover, information provided by the base stations 105 during establishment of the ANs 210 may enable the network to establish wireless connections between UEs 115 via ANs 210 which will result in more efficient and reliable wireless communications.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for assisted sidelink bearer establishment as described herein, or the processor 840 and the memory 830 may be otherwise configured to perform or support such operations.

Figure 9:
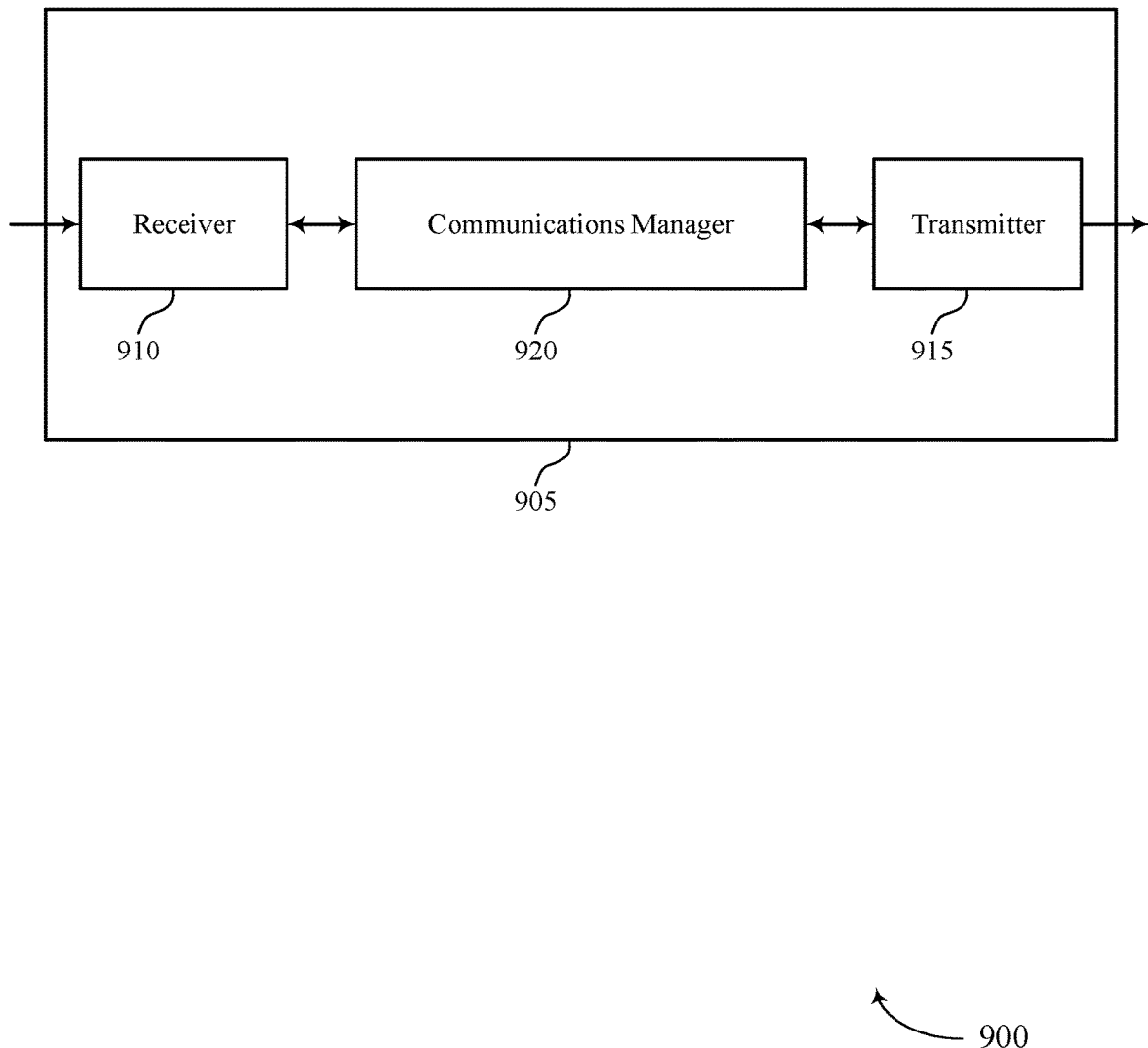
FIGS. 9 and 10 show block diagrams of devices that support techniques for assisted sidelink bearer establishment in accordance with aspects of the present disclosure.

FIG. 9 shows a block diagram 900 of a device 905 that supports techniques for assisted sidelink bearer establishment in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for assisted sidelink bearer establishment). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for assisted sidelink bearer establishment). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for assisted sidelink bearer establishment as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for receiving, from a first UE, a request for the base station to establish a wireless communication link between the first UE and a second UE via at least one AN. The communications manager 920 may be configured as or otherwise support a means for transmitting, to the first UE in response to the request, first control signaling including an indication for the first UE to perform a directional learning procedure with an AN. The communications manager 920 may be configured as or otherwise support a means for receiving, from the first UE, the AN, or both, and based on the first control signaling, an uplink message including an indication of a completion of the directional learning procedure performed with the AN. The communications manager 920 may be configured as or otherwise support a means for transmitting, to the first UE, the AN, or both, and in response to the uplink message, second control signaling indicating a set of resources for performing a link configuration procedure between the first UE and the AN.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for improved establishment of wireless links via ANs 210. In particular, techniques described herein may enable the base stations 105 to facilitate establishment of sidelink communication links between UEs 115 through ANs 210, which may expedite the sidelink bearer establishment via the ANs 210. In particular, base stations 105 may provide information to the UEs 115 and ANs 210 which may enable the ANs 210 to sweep through fewer quantities of candidate beams and/or candidate link configurations, thereby expediting the establishment of wireless communications via the ANs 210. Moreover, information provided by the base stations 105 during establishment of the ANs 210 may enable the network to establish wireless connections between UEs 115 via ANs 210 which will result in more efficient and reliable wireless communications.

Figure 10:
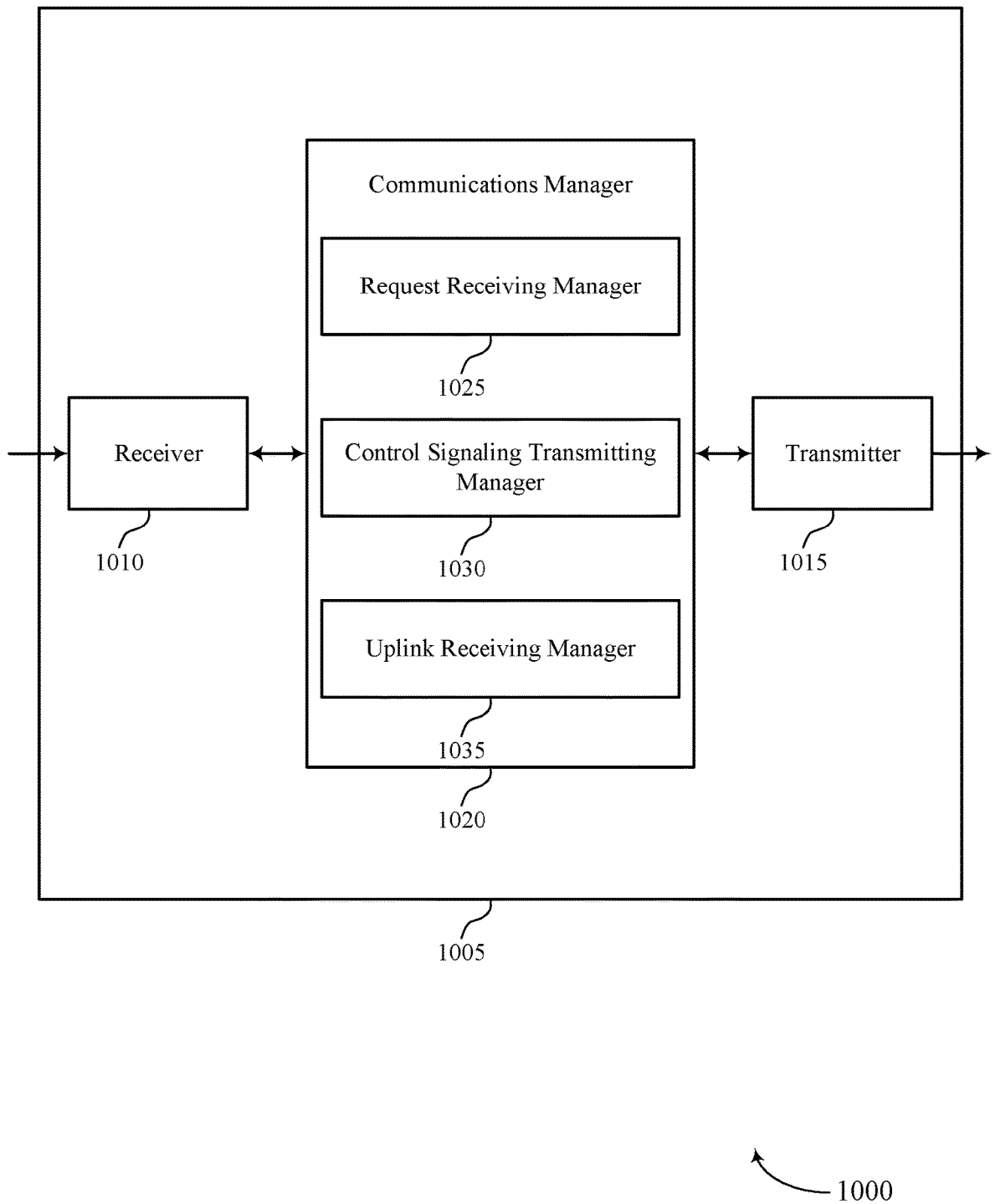

FIG. 10 shows a block diagram 1000 of a device 1005 that supports techniques for assisted sidelink bearer establishment in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for assisted sidelink bearer establishment). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for assisted sidelink bearer establishment). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for assisted sidelink bearer establishment as described herein. For example, the communications manager 1020 may include a request receiving manager 1025, a control signaling transmitting manager 1030, an uplink receiving manager 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The request receiving manager 1025 may be configured as or otherwise support a means for receiving, from a first UE, a request for the base station to establish a wireless communication link between the first UE and a second UE via at least one AN. The control signaling transmitting manager 1030 may be configured as or otherwise support a means for transmitting, to the first UE in response to the request, first control signaling including an indication for the first UE to perform a directional learning procedure with an AN. The uplink receiving manager 1035 may be configured as or otherwise support a means for receiving, from the first UE, the AN, or both, and based on the first control signaling, an uplink message including an indication of a completion of the directional learning procedure performed with the AN. The control signaling transmitting manager 1030 may be configured as or otherwise support a means for transmitting, to the first UE, the AN, or both, and in response to the uplink message, second control signaling indicating a set of resources for performing a link configuration procedure between the first UE and the AN.

Figure 11:
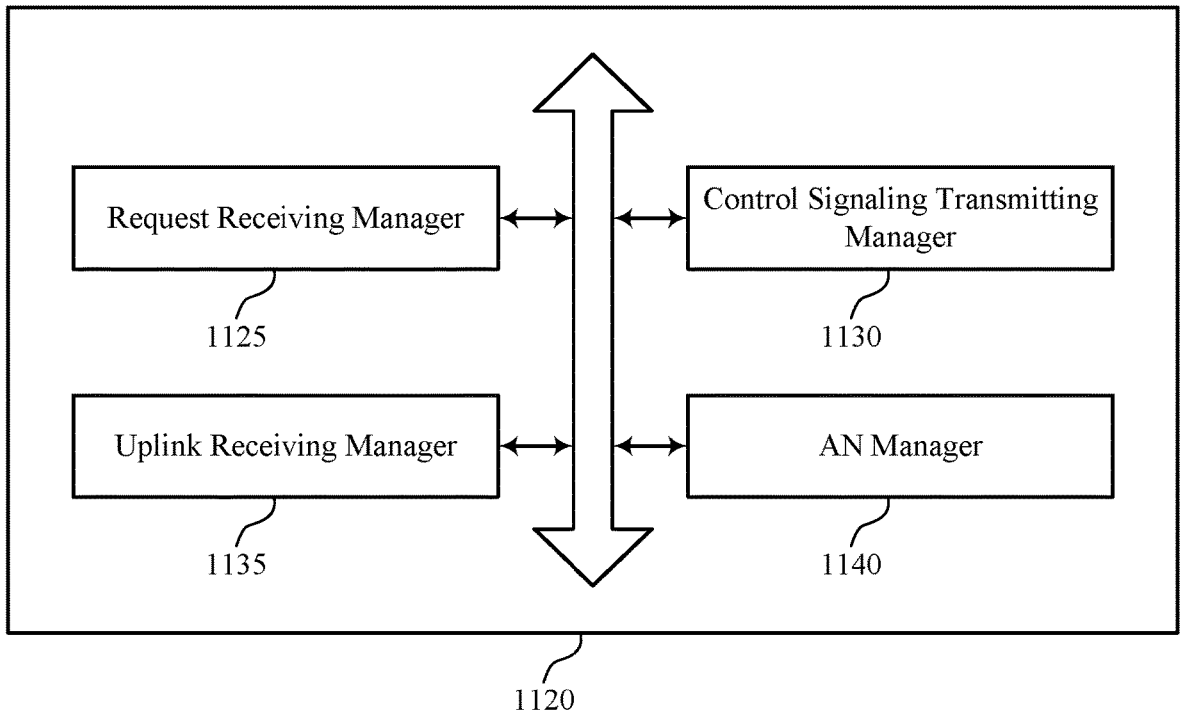
FIG. 11 shows a block diagram of a communications manager that supports techniques for assisted sidelink bearer establishment in accordance with aspects of the present disclosure.

FIG. 11 shows a block diagram 1100 of a communications manager 1120 that supports techniques for assisted sidelink bearer establishment in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for assisted sidelink bearer establishment as described herein. For example, the communications manager 1120 may include a request receiving manager 1125, a control signaling transmitting manager 1130, an uplink receiving manager 1135, an AN manager 1140, or any combination thereof. Each of these components may communicate, directly or indirectly, with one another (e.g., via one or more buses).

The communications manager 1120 may support wireless communication at a base station in accordance with examples as disclosed herein. The request receiving manager 1125 may be configured as or otherwise support a means for receiving, from a first UE, a request for the base station to establish a wireless communication link between the first UE and a second UE via at least one AN. The control signaling transmitting manager 1130 may be configured as or otherwise support a means for transmitting, to the first UE in response to the request, first control signaling including an indication for the first UE to perform a directional learning procedure with an AN. The uplink receiving manager 1135 may be configured as or otherwise support a means for receiving, from the first UE, the AN, or both, and based on the first control signaling, an uplink message including an indication of a completion of the directional learning procedure performed with the AN. In some examples, the control signaling transmitting manager 1130 may be configured as or otherwise support a means for transmitting, to the first UE, the AN, or both, and in response to the uplink message, second control signaling indicating a set of resources for performing a link configuration procedure between the first UE and the AN.

In some examples, the uplink receiving manager 1135 may be configured as or otherwise support a means for receiving, from the first UE, an additional AN, or both, and based on transmitting the first control signaling, an additional uplink message including an indication of a completion of an additional directional learning procedure performed between the first UE and the additional AN. In some examples, the AN manager 1140 may be configured as or otherwise support a means for selecting the AN for establishing the wireless communication link between the first UE and the second UE based on a comparison of the uplink message and the additional uplink message, where transmitting the second control signaling is based on the selecting.

In some examples, the request receiving manager 1125 may be configured as or otherwise support a means for receiving, via the request, an indication of one or more parameters associated with the second UE, where transmitting the first control signaling is based on the indication of the one or more parameters.

In some examples, the one or more parameters include a destination identifier associated with the second UE, a peer L2 identifier associated with the second UE, a geographical location of the second UE, a sidelink zone identifier associated with the second UE, a cell identifier associated with the second UE, a type of communication service to be established with the second UE, or any combination thereof.

In some examples, the request receiving manager 1125 may be configured as or otherwise support a means for receiving, via the request, an indication of one or more ANs which are within a range of the first UE, where transmitting the first control signaling is based on receiving the indication of the one or more identified ANs.

In some examples, the request receiving manager 1125 may be configured as or otherwise support a means for receiving, via the request, information associated with each AN of the one or more identified ANs, where the information includes a distance between the first UE and each respective AN, a signal strength metric associated with signals received from each respective AN, a signal quality metric associated with signals received from each respective AN, or any combination thereof, where transmitting the first control signaling is based on the information associated with each AN.

In some examples, the control signaling transmitting manager 1130 may be configured as or otherwise support a means for transmitting, to the first UE, an indication of a set of multiple transmission occasions associated with a periodicity, the set of multiple transmission occasions configured for communicating requests for the base station to establish wireless connections between wireless devices via ANs, where the request is received within a transmission occasion of the set of multiple transmission occasions.

In some examples, the request receiving manager 1125 may be configured as or otherwise support a means for receiving the request from the first UE based on the first UE being unable to establish a sidelink communication link with the second UE.

In some examples, the control signaling transmitting manager 1130 may be configured as or otherwise support a means for transmitting, via the first control signaling, an indication of an additional set of resources for performing the directional learning procedure with the AN, where receiving the uplink message is based on the indication of the additional set of resources.

In some examples, the control signaling transmitting manager 1130 may be configured as or otherwise support a means for transmitting, via the first control signaling, an indication of a position of the AN, a direction of the AN relative to the first UE, or both, where receiving the uplink message is based on the indication of the position, the direction, or both.

In some examples, the uplink receiving manager 1135 may be configured as or otherwise support a means for receiving, via the uplink message, a measurement report associated with wireless communications between the first UE and the AN, a QCL associated with the AN, or both, where transmitting the second control signaling is based on the measurement report, the QCL, or both.

Figure 12:
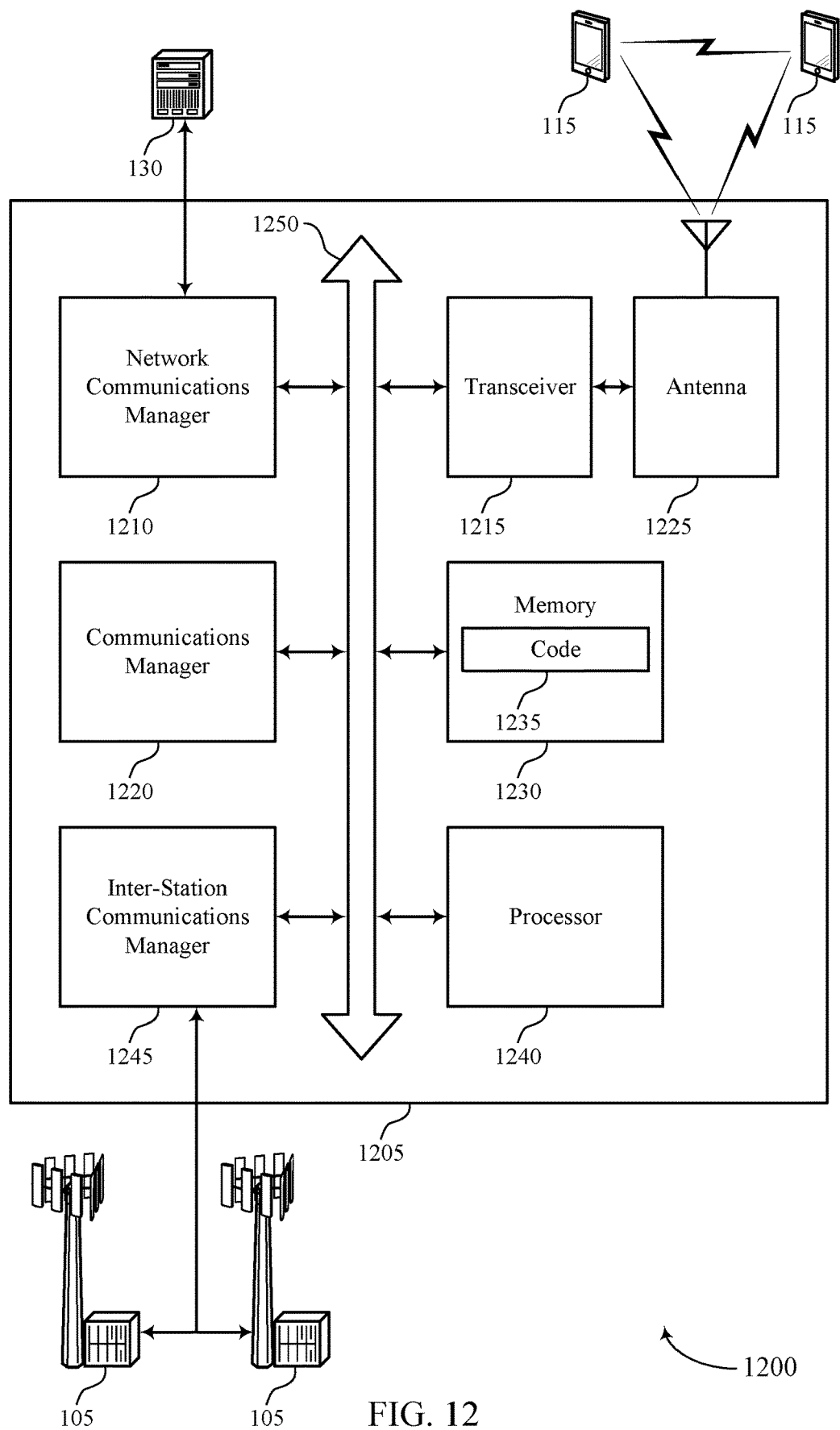
FIG. 12 shows a diagram of a system including a device that supports techniques for assisted sidelink bearer establishment in accordance with aspects of the present disclosure.

FIG. 12 shows a diagram of a system 1200 including a device 1205 that supports techniques for assisted sidelink bearer establishment in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for assisted sidelink bearer establishment). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for receiving, from a first UE, a request for the base station to establish a wireless communication link between the first UE and a second UE via at least one AN. The communications manager 1220 may be configured as or otherwise support a means for transmitting, to the first UE in response to the request, first control signaling including an indication for the first UE to perform a directional learning procedure with an AN. The communications manager 1220 may be configured as or otherwise support a means for receiving, from the first UE, the AN, or both, and based on the first control signaling, an uplink message including an indication of a completion of the directional learning procedure performed with the AN. The communications manager 1220 may be configured as or otherwise support a means for transmitting, to the first UE, the AN, or both, and in response to the uplink message, second control signaling indicating a set of resources for performing a link configuration procedure between the first UE and the AN.

By including or configuring the communications manager 1220 in accordance with examples as described herein, the device 1205 may support techniques for improved establishment of wireless links via ANs 210. In particular, techniques described herein may enable the base stations 105 to facilitate establishment of sidelink communication links between UEs 115 through ANs 210, which may expedite the sidelink bearer establishment via the ANs 210. In particular, base stations 105 may provide information to the UEs 115 and ANs 210 which may enable the ANs 210 to sweep through fewer quantities of candidate beams and/or candidate link configurations, thereby expediting the establishment of wireless communications via the ANs 210. Moreover, information provided by the base stations 105 during establishment of the ANs 210 may enable the network to establish wireless connections between UEs 115 via ANs 210 which will result in more efficient and reliable wireless communications.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for assisted sidelink bearer establishment as described herein, or the processor 1240 and the memory 1230 may be otherwise configured to perform or support such operations.

Figure 13:
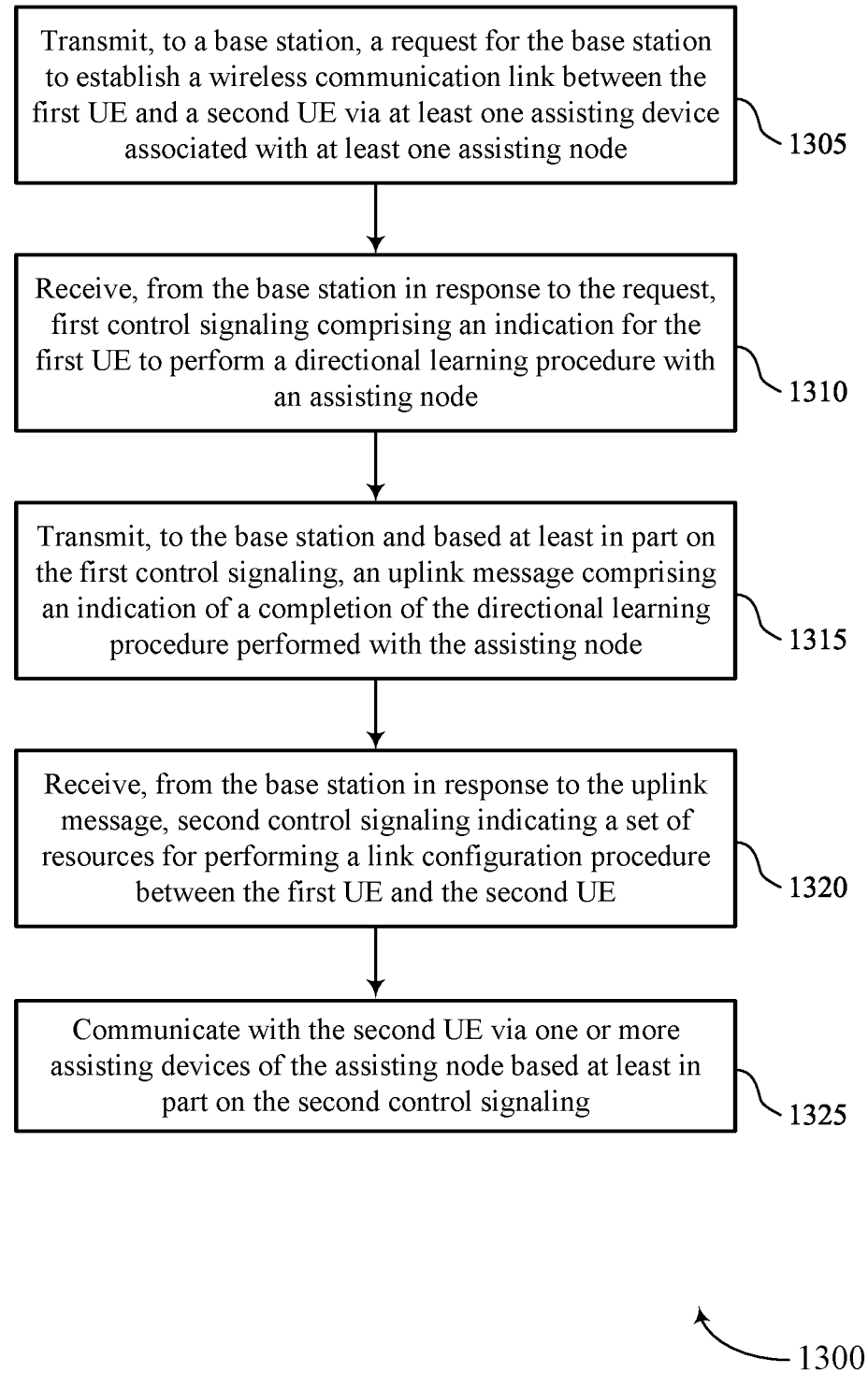
FIGS. 13 through 17 show flowcharts illustrating methods that support techniques for assisted sidelink bearer establishment in accordance with aspects of the present disclosure.

FIG. 13 shows a flowchart illustrating a method 1300 that supports techniques for assisted sidelink bearer establishment in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include transmitting, to a base station, a request for the base station to establish a wireless communication link between the first UE and a second UE via at least one AD associated with at least one AN. The operations of 1305 may be performed in accordance with examples as disclosed herein. In some examples, aspects of the operations of 1305 may be performed by a request transmitting manager 725 as described with reference to FIG. 7.

At 1310, the method may include receiving, from the base station in response to the request, first control signaling including an indication for the first UE to perform a directional learning procedure with an AN. The operations of 1310 may be performed in accordance with examples as disclosed herein. In some examples, aspects of the operations of 1310 may be performed by a control signaling receiving manager 730 as described with reference to FIG. 7.

At 1315, the method may include transmitting, to the base station and based on the first control signaling, an uplink message including an indication of a completion of the directional learning procedure performed with the AN. The operations of 1315 may be performed in accordance with examples as disclosed herein. In some examples, aspects of the operations of 1315 may be performed by an uplink transmitting manager 735 as described with reference to FIG. 7.

At 1320, the method may include receiving, from the base station in response to the uplink message, second control signaling indicating a set of resources for performing a link configuration procedure between the first UE and second UE. The operations of 1320 may be performed in accordance with examples as disclosed herein. In some examples, aspects of the operations of 1320 may be performed by a control signaling receiving manager 730 as described with reference to FIG. 7.

At 1325, the method may include communicating with the second UE via one or more ADs associated with the AN based on the second control signaling. The operations of 1325 may be performed in accordance with examples as disclosed herein. In some examples, aspects of the operations of 1325 may be performed by a sidelink communicating manager 740 as described with reference to FIG. 7.

Figure 14:
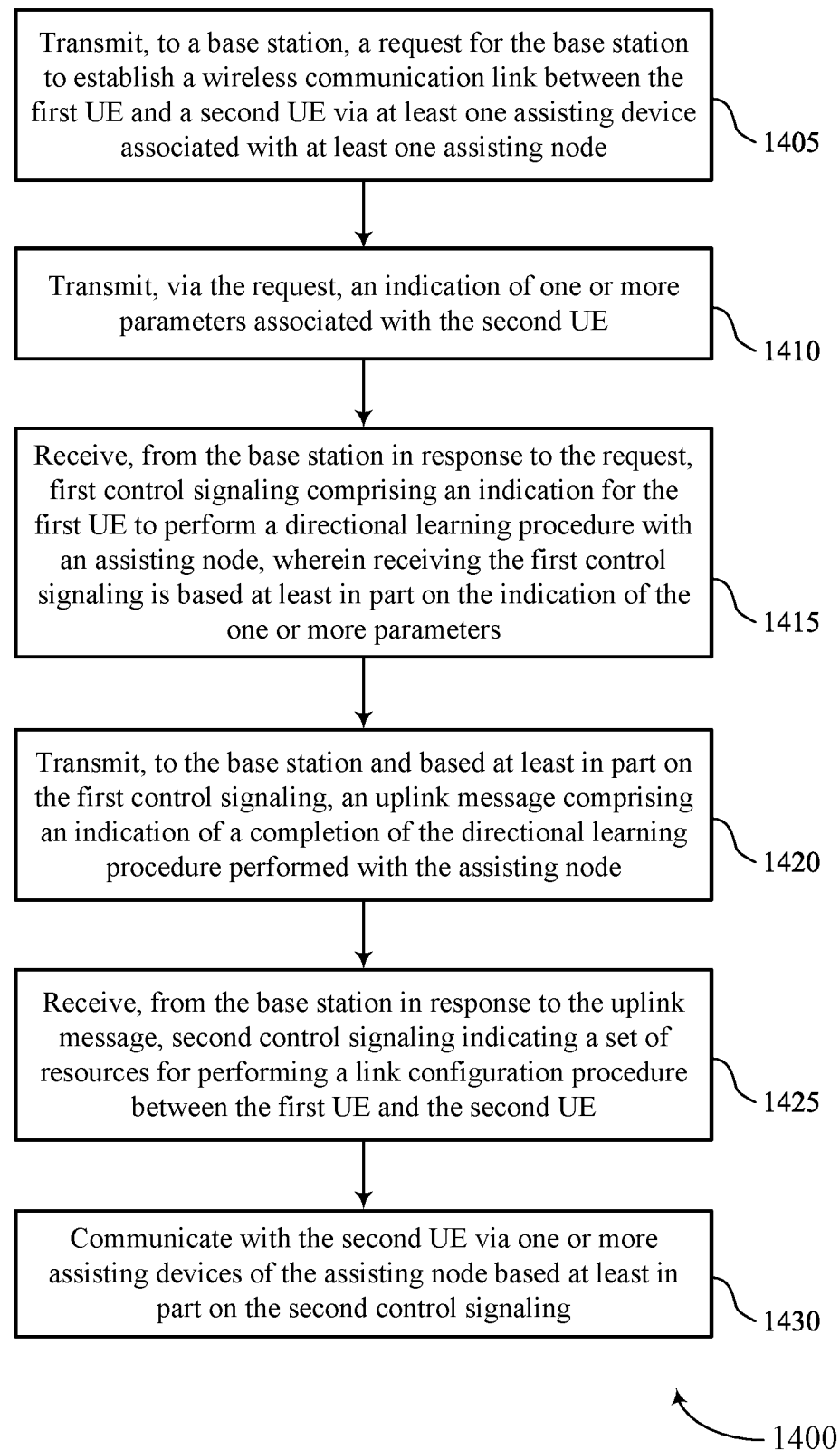

FIG. 14 shows a flowchart illustrating a method 1400 that supports techniques for assisted sidelink bearer establishment in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include transmitting, to a base station, a request for the base station to establish a wireless communication link between the first UE and a second UE via at least one AD associated with at least one AN. The operations of 1405 may be performed in accordance with examples as disclosed herein. In some examples, aspects of the operations of 1405 may be performed by a request transmitting manager 725 as described with reference to FIG. 7.

At 1410, the method may include transmitting, via the request, an indication of one or more parameters associated with the second UE. The operations of 1410 may be performed in accordance with examples as disclosed herein. In some examples, aspects of the operations of 1410 may be performed by a request transmitting manager 725 as described with reference to FIG. 7.

At 1415, the method may include receiving, from the base station in response to the request, first control signaling including an indication for the first UE to perform a directional learning procedure with an AN, where receiving the first control signaling is based on the indication of the one or more parameters. The operations of 1415 may be performed in accordance with examples as disclosed herein. In some examples, aspects of the operations of 1415 may be performed by a control signaling receiving manager 730 as described with reference to FIG. 7.

At 1420, the method may include transmitting, to the base station and based on the first control signaling, an uplink message including an indication of a completion of the directional learning procedure performed with the AN. The operations of 1420 may be performed in accordance with examples as disclosed herein. In some examples, aspects of the operations of 1420 may be performed by an uplink transmitting manager 735 as described with reference to FIG. 7.

At 1425, the method may include receiving, from the base station in response to the uplink message, second control signaling indicating a set of resources for performing a link configuration procedure between the first UE and the second UE. The operations of 1425 may be performed in accordance with examples as disclosed herein. In some examples, aspects of the operations of 1425 may be performed by a control signaling receiving manager 730 as described with reference to FIG. 7.

At 1430, the method may include communicating with the second UE via one or more ADs of the AN based on the second control signaling. The operations of 1430 may be performed in accordance with examples as disclosed herein. In some examples, aspects of the operations of 1430 may be performed by a sidelink communicating manager 740 as described with reference to FIG. 7.

Figure 15:
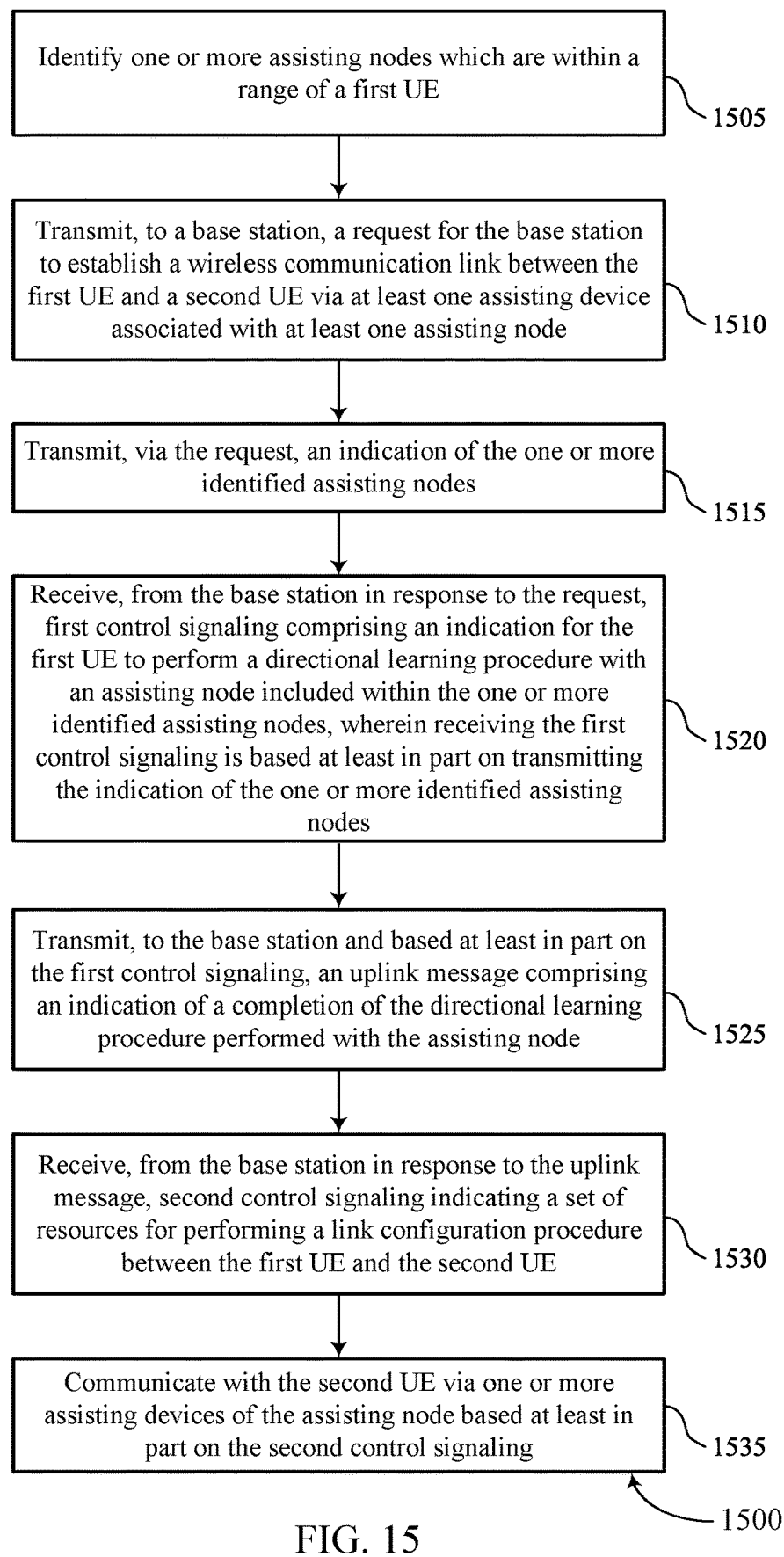

FIG. 15 shows a flowchart illustrating a method 1500 that supports techniques for assisted sidelink bearer establishment in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include identifying one or more ANs which are within a range of a first UE. The operations of 1505 may be performed in accordance with examples as disclosed herein. In some examples, aspects of the operations of 1505 may be performed by an AN manager 745 as described with reference to FIG. 7.

At 1510, the method may include transmitting, to a base station, a request for the base station to establish a wireless communication link between the first UE and a second UE via at least one AD associated with at least one AN. The operations of 1510 may be performed in accordance with examples as disclosed herein. In some examples, aspects of the operations of 1510 may be performed by a request transmitting manager 725 as described with reference to FIG. 7.

At 1515, the method may include transmitting, via the request, an indication of the one or more identified ANs. The operations of 1515 may be performed in accordance with examples as disclosed herein. In some examples, aspects of the operations of 1515 may be performed by a request transmitting manager 725 as described with reference to FIG. 7.

At 1520, the method may include receiving, from the base station in response to the request, first control signaling including an indication for the first UE to perform a directional learning procedure with an AN included within the one or more identified ANs, where receiving the first control signaling is based on transmitting the indication of the one or more identified ANs. The operations of 1520 may be performed in accordance with examples as disclosed herein. In some examples, aspects of the operations of 1520 may be performed by a control signaling receiving manager 730 as described with reference to FIG. 7.

At 1525, the method may include transmitting, to the base station and based on the first control signaling, an uplink message including an indication of a completion of the directional learning procedure performed with the AN. The operations of 1525 may be performed in accordance with examples as disclosed herein. In some examples, aspects of the operations of 1525 may be performed by an uplink transmitting manager 735 as described with reference to FIG. 7.

At 1530, the method may include receiving, from the base station in response to the uplink message, second control signaling indicating a set of resources for performing a link configuration procedure between the first UE and the second UE. The operations of 1530 may be performed in accordance with examples as disclosed herein. In some examples, aspects of the operations of 1530 may be performed by a control signaling receiving manager 730 as described with reference to FIG. 7.

At 1535, the method may include communicating with the second UE via one or more ADs of the AN based on the second control signaling. The operations of 1535 may be performed in accordance with examples as disclosed herein. In some examples, aspects of the operations of 1535 may be performed by a sidelink communicating manager 740 as described with reference to FIG. 7.

Figure 16:
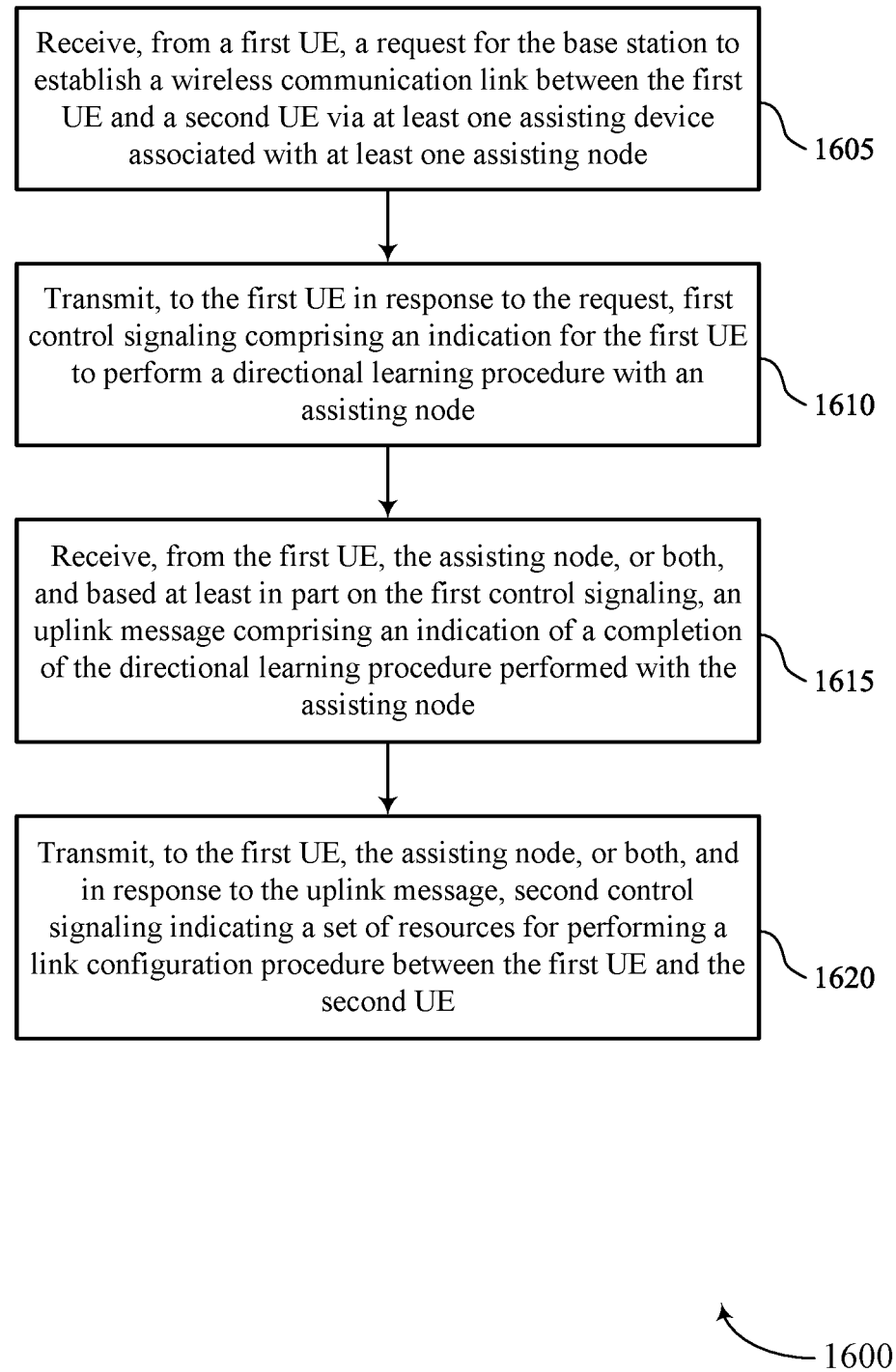

FIG. 16 shows a flowchart illustrating a method 1600 that supports techniques for assisted sidelink bearer establishment in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include receiving, from a first UE, a request for the base station to establish a wireless communication link between the first UE and a second UE via at least one AD associated with at least one AN. The operations of 1605 may be performed in accordance with examples as disclosed herein. In some examples, aspects of the operations of 1605 may be performed by a request receiving manager 1125 as described with reference to FIG. 11.

At 1610, the method may include transmitting, to the first UE in response to the request, first control signaling including an indication for the first UE to perform a directional learning procedure with an AN. The operations of 1610 may be performed in accordance with examples as disclosed herein. In some examples, aspects of the operations of 1610 may be performed by a control signaling transmitting manager 1130 as described with reference to FIG. 11.

At 1615, the method may include receiving, from the first UE, the AN, or both, and based on the first control signaling, an uplink message including an indication of a completion of the directional learning procedure performed with the AN.

The operations of 1615 may be performed in accordance with examples as disclosed herein. In some examples, aspects of the operations of 1615 may be performed by an uplink receiving manager 1135 as described with reference to FIG. 11.

At 1620, the method may include transmitting, to the first UE, the AN, or both, and in response to the uplink message, second control signaling indicating a set of resources for performing a link configuration procedure between the first UE and the second UE. The operations of 1620 may be performed in accordance with examples as disclosed herein. In some examples, aspects of the operations of 1620 may be performed by a control signaling transmitting manager 1130 as described with reference to FIG. 11.

Figure 17:
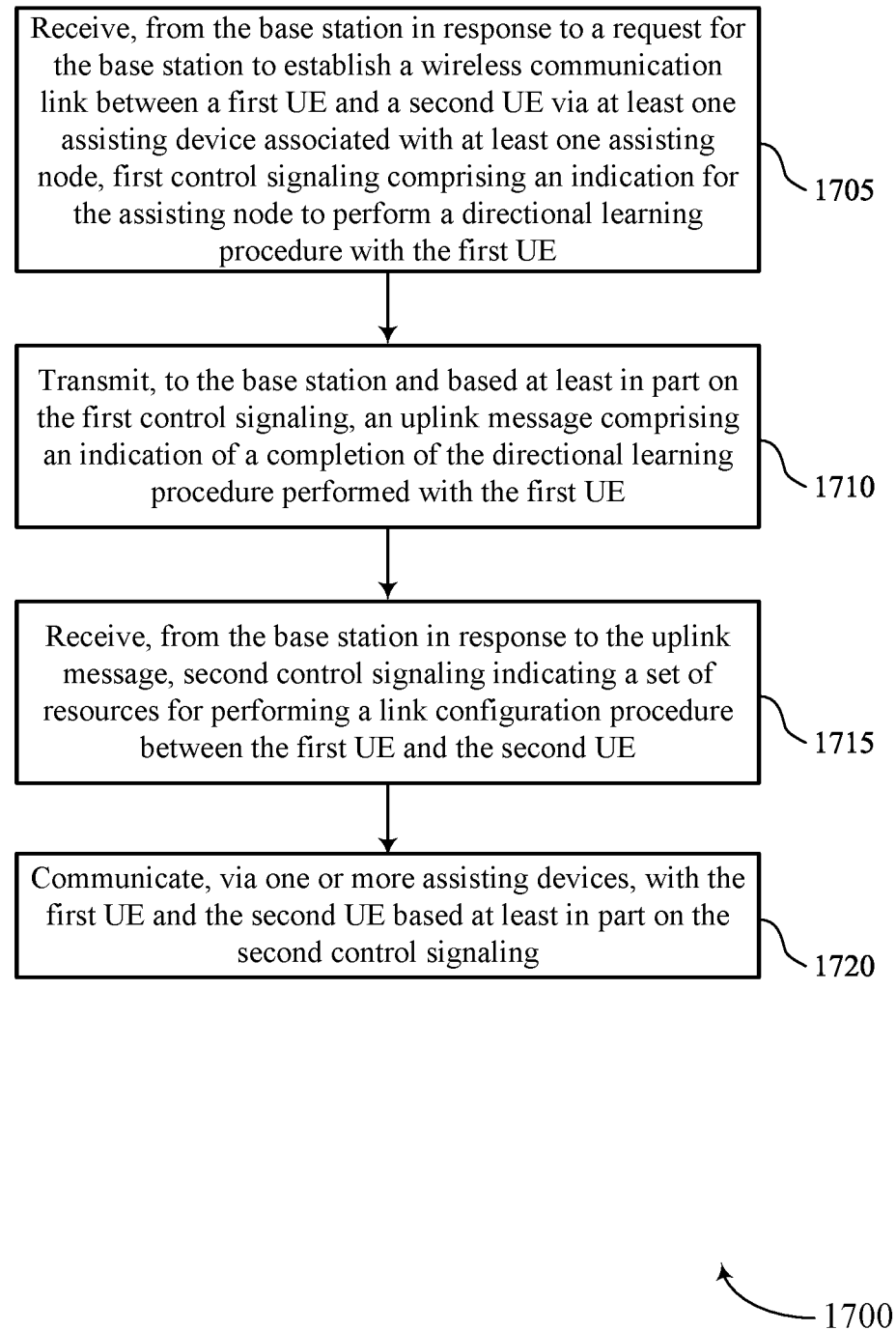

FIG. 17 shows a flowchart illustrating a method 1700 that supports techniques for assisted sidelink bearer establishment in accordance with aspects of the present disclosure. The operations of the method 1700 may be implemented by a UE or its components as described herein. For example, the operations of the method 1700 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, first control signaling including an indication for the AN to perform a directional learning procedure with a first UE. The operations of 1705 may be performed in accordance with examples as disclosed herein. In some examples, aspects of the operations of 1705 may be performed by a control signaling receiving manager 730 as described with reference to FIG. 7.

At 1710, the method may include transmitting, to the base station and based on the first control signaling, an uplink message including an indication of a completion of the directional learning procedure performed with the first UE. The operations of 1710 may be performed in accordance with examples as disclosed herein. In some examples, aspects of the operations of 1710 may be performed by an uplink transmitting manager 735 as described with reference to FIG. 7.

At 1715, the method may include receiving, from the base station in response to the uplink message, second control signaling indicating a set of resources for performing a link configuration procedure between the first UE and the second UE. The operations of 1715 may be performed in accordance with examples as disclosed herein. In some examples, aspects of the operations of 1715 may be performed by a control signaling receiving manager 730 as described with reference to FIG. 7.

At 1720, the method may include communicating, via one or more assisting devices of the assisting node, with the first UE and the second UE based on the second control signaling. The operations of 1720 may be performed in accordance with examples as disclosed herein. In some examples, aspects of the operations of 1720 may be performed by a sidelink communicating manager 740 as described with reference to FIG. 7.

The following provides an overview of aspects of the present disclosure:

Aspect 1: A method for wireless communication at a first UE, comprising: transmitting, to a base station, a request for the base station to establish a wireless communication link between the first UE and a second UE via at least one AD associated with at least one AN; receiving, from the base station in response to the request, first control signaling comprising an indication for the first UE to perform a directional learning procedure with an AN; transmitting, to the base station and based at least in part on the first control signaling, an uplink message comprising an indication of a completion of the directional learning procedure performed with the AN; receiving, from the base station in response to the uplink message, second control signaling indicating a set of resources for performing a link configuration procedure between the first UE and the second UE; and communicating with the second UE via one or more ADs of the AN based at least in part on the second control signaling.

Aspect 2: The method of aspect 1, further comprising: transmitting, via the request, an indication of one or more parameters associated with the second UE, wherein receiving the first control signaling is based at least in part on the indication of the one or more parameters.

Aspect 3: The method of aspect 2, wherein the one or more parameters comprise a destination identifier associated with the second UE, a peer L2 identifier associated with the second UE, a geographical location of the second UE, a sidelink zone identifier associated with the second UE, a cell identifier associated with the second UE, a type of communication service to be established with the second UE, or any combination thereof.

Aspect 4: The method of any of aspects 1 through 3, further comprising: identifying one or more ANs which are within a range of the first UE, and transmitting, via the request, an indication of the one or more identified ANs, wherein receiving the first control signaling is based at least in part on transmitting the indication of the one or more identified ANs.

Aspect 5: The method of aspect 4, further comprising: transmitting, via the request, information associated with each AN of the one or more identified ANs, wherein the information comprises a distance between the first UE and each respective AN, a signal strength metric associated with signals received from each respective AN, a signal quality metric associated with signals received from each respective AN, or any combination thereof, wherein receiving the first control signaling is based at least in part on the information associated with each AN.

Aspect 6: The method of any of aspects 1 through 5, further comprising: receiving, from the base station, an indication of a plurality of transmission occasions associated with a periodicity, the plurality of transmission occasions configured for communicating requests for the base station to establish wireless connections between wireless devices via ANs, wherein the request is transmitted within a transmission occasion of the plurality of transmission occasions.

Aspect 7: The method of any of aspects 1 through 6, further comprising: transmitting the request to the base station based at least in part on the first UE being unable to establish a sidelink communication link with the second UE.

Aspect 8: The method of any of aspects 1 through 7, further comprising: receiving, via the first control signaling, an indication of an additional set of resources for performing the directional learning procedure with the AN; and performing directional learning communications with the AN within the additional set of resources to perform the directional learning procedure, wherein transmitting the uplink message is based at least in part on the performance of the directional learning communications.

Aspect 9: The method of any of aspects 1 through 8, further comprising: receiving, via the first control signaling, an indication of a position of the AN, a direction of the AN relative to the first UE, or both; and performing directional learning communications with the AN based at least in part on the position, the direction, or both, wherein transmitting the uplink message is based at least in part on the performance of the directional learning communications.

Aspect 10: The method of any of aspects 1 through 9, further comprising: transmitting, via the uplink message, a measurement report associated with wireless communications between the first UE and the AN, a QCL associated with the AN, or both, wherein receiving the second control signaling is based at least in part on the measurement report, the QCL, or both.

Aspect 11: The method of any of aspects 1 through 10, further comprising: communicating with the second UE via the one or more ADs of the AN within the set of resources for the link configuration procedure in accordance with a plurality of link configurations associated with the one or more ADs of the AN, wherein communicating with the second UE via the one or more ADs of the AN comprises communicating in accordance with a link configuration of the plurality of link configurations.

Aspect 12: The method of aspect 11, further comprising: receiving, via the second control signaling, an indication of the plurality of link configurations.

Aspect 13: A method for wireless communication at a base station, comprising: receiving, from a first UE, a request for the base station to establish a wireless communication link between the first UE and a second UE via at least one AD associated with at least one AN; transmitting, to the first UE in response to the request, first control signaling comprising an indication for the first UE to perform a directional learning procedure with an AN; receiving, from the first UE, the AN, or both, and based at least in part on the first control signaling, an uplink message comprising an indication of a completion of the directional learning procedure performed with the AN; and transmitting, to the first UE, the AN, or both, and in response to the uplink message, second control signaling indicating a set of resources for performing a link configuration procedure between the first UE and the second UE.

Aspect 14: The method of aspect 13, further comprising: receiving, from the first UE, an additional AN, or both, and based at least in part on transmitting the first control signaling, an additional uplink message comprising an indication of a completion of an additional directional learning procedure performed between the first UE and the additional AN; selecting the AN for establishing the wireless communication link between the first UE and the second UE based at least in part on a comparison of the uplink message and the additional uplink message, wherein transmitting the second control signaling is based at least in part on the selecting.

Aspect 15: The method of any of aspects 13 through 14, further comprising: receiving, via the request, an indication of one or more parameters associated with the second UE, wherein transmitting the first control signaling is based at least in part on the indication of the one or more parameters.

Aspect 16: The method of aspect 15, wherein the one or more parameters comprise a destination identifier associated with the second UE, a peer L2 identifier associated with the second UE, a geographical location of the second UE, a sidelink zone identifier associated with the second UE, a cell identifier associated with the second UE, a type of communication service to be established with the second UE, or any combination thereof.

Aspect 17: The method of any of aspects 13 through 16, further comprising: receiving, via the request, an indication of one or more ANs which are within a range of the first UE, wherein transmitting the first control signaling is based at least in part on receiving the indication of the one or more identified ANs.

Aspect 18: The method of aspect 17, further comprising: receiving, via the request, information associated with each AN of the one or more identified ANs, wherein the information comprises a distance between the first UE and each respective AN, a signal strength metric associated with signals received from each respective AN, a signal quality metric associated with signals received from each respective AN, or any combination thereof, wherein transmitting the first control signaling is based at least in part on the information associated with each AN.

Aspect 19: The method of any of aspects 13 through 18, further comprising: transmitting, to the first UE, an indication of a plurality of transmission occasions associated with a periodicity, the plurality of transmission occasions configured for communicating requests for the base station to establish wireless connections between wireless devices via ANs, wherein the request is received within a transmission occasion of the plurality of transmission occasions.

Aspect 20: The method of any of aspects 13 through 19, further comprising: receiving the request from the first UE based at least in part on the first UE being unable to establish a sidelink communication link with the second UE.

Aspect 21: The method of any of aspects 13 through 20, further comprising: transmitting, via the first control signaling, an indication of an additional set of resources for performing the directional learning procedure with the AN, wherein receiving the uplink message is based at least in part on the indication of the additional set of resources.

Aspect 22: The method of any of aspects 13 through 21, further comprising: transmitting, via the first control signaling, an indication of a position of the AN, a direction of the AN relative to the first UE, or both, wherein receiving the uplink message is based at least in part on the indication of the position, the direction, or both.

Aspect 23: The method of any of aspects 13 through 22, further comprising: receiving, via the uplink message, a measurement report associated with wireless communications between the first UE and the AN, a QCL associated with the AN, or both, wherein transmitting the second control signaling is based at least in part on the measurement report, the QCL, or both.

Aspect 24: A method for wireless communication at an AN, comprising: receiving, from the base station in response to a request for the base station to establish a wireless communication link between a first UE and a second UE via one or more ADs of the AN, first control signaling comprising an indication for the AN to perform a directional learning procedure with the first UE; transmitting, to the base station and based at least in part on the first control signaling, an uplink message comprising an indication of a completion of the directional learning procedure performed with the first UE; receiving, from the base station in response to the uplink message, second control signaling indicating a set of resources for performing a link configuration procedure between the first UE and the second UE; and communicating, via the one or more ADs, with the first UE and the second UE based at least in part on the second control signaling.

Aspect 25: The method of aspect 24, further comprising: receiving, via the first control signaling, an indication of an additional set of resources for performing the directional learning procedure with the first UE; and performing directional learning communications with the first UE within the additional set of resources to perform the directional learning procedure, wherein transmitting the uplink message is based at least in part on the performance of the directional learning communications.

Aspect 26: The method of any of aspects 24 through 25, further comprising: receiving, via the first control signaling, an indication of a position of the first UE, a first direction of the first UE relative to the AN, or both; and performing directional learning communications with the first UE based at least in part on the position, the direction, or both, wherein transmitting the uplink message is based at least in part on the performance of the directional learning communications.

Aspect 27: The method of any of aspects 24 through 26, further comprising: transmitting, via the uplink message, a measurement report associated with wireless communications between the first UE and the AN, a QCL associated with the AN, or both, wherein receiving the second control signaling is based at least in part on the measurement report, the QCL, or both.

Aspect 28: The method of any of aspects 24 through 27, further comprising: communicating with the first UE within the set of resources for the link configuration procedure in accordance with a plurality of link configurations associated with the one or more ADs of the AN, wherein communicating with the first UE and the second UE comprises communicating in accordance with a link configuration of the plurality of link configurations.

Aspect 29: The method of aspect 28, further comprising: receiving, via the second control signaling, an indication of the plurality of link configurations.

Aspect 30: An apparatus for wireless communication at a first UE, comprising a processor; memory coupled with the processor; and instructions stored in the memory and executable by the processor to cause the apparatus to perform a method of any of aspects 1 through 12.

Aspect 31: An apparatus for wireless communication at a first UE, comprising at least one means for performing a method of any of aspects 1 through 12.

Aspect 32: A non-transitory computer-readable medium storing code for wireless communication at a first UE, the code comprising instructions executable by a processor to perform a method of any of aspects 1 through 12.

Aspect 33: An apparatus for wireless communication at a base station, comprising a processor; memory coupled with the processor; and instructions stored in the memory and executable by the processor to cause the apparatus to perform a method of any of aspects 13 through 23.

Aspect 34: An apparatus for wireless communication at a base station, comprising at least one means for performing a method of any of aspects 13 through 23.

Aspect 35: A non-transitory computer-readable medium storing code for wireless communication at a base station, the code comprising instructions executable by a processor to perform a method of any of aspects 13 through 23.

Aspect 36: An apparatus for wireless communication at an AN, comprising a processor; memory coupled with the processor; and instructions stored in the memory and executable by the processor to cause the apparatus to perform a method of any of aspects 24 through 29.

Aspect 37: An apparatus for wireless communication at an AN, comprising at least one means for performing a method of any of aspects 24 through 29.

Aspect 38: A non-transitory computer-readable medium storing code for wireless communication at an AN, the code comprising instructions executable by a processor to perform a method of any of aspects 24 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first user equipment (UE), comprising:
    at least one processor;
    memory coupled with the at least one processor; and
    instructions stored in the memory and executable by the at least one processor to cause the apparatus to:
        transmit, to a network entity, a request for the network entity to establish a wireless communication link between the first UE and a second UE via at least one assisting device associated with at least one assisting node;
        receive, from the network entity in response to the request, first control signaling comprising an indication for the first UE to perform a directional learning procedure with the second UE via an assisting node associated with a plurality of beam pair links, wherein the first control signaling comprises information associated with a subset of beam pair links from the plurality of beam pair links that are to be used for the directional learning procedure;
        transmit, to the network entity and based at least in part on the first control signaling, an uplink message comprising an indication of a completion of the directional learning procedure performed with the assisting node using the subset of beam pair links;
        receive, from the network entity in response to the uplink message, second control signaling indicating a set of resources for performing a link configuration procedure between the first UE and the second UE, wherein the second control signaling indicates a set of candidate link configurations that are usable for communications via at least one beam pair link of the subset of beam pair links; and
        communicate, based at least in part on the first control signaling and the second control signaling, with the second UE via one or more assisting devices of the assisting node using a link configuration of the set of candidate link configurations and via the at least one beam pair link of the subset of beam pair links.

2. The apparatus of claim 1, wherein the instructions are further executable by the at least one processor to cause the apparatus to:
transmit, via the request, an indication of one or more parameters associated with the second UE, wherein receiving the first control signaling is based at least in part on the indication of the one or more parameters.

3. The apparatus of claim 2, wherein the one or more parameters comprise a destination identifier associated with the second UE, a peer layer 2 identifier associated with the second UE, a geographical location of the second UE, a sidelink zone identifier associated with the second UE, a cell identifier associated with the second UE, a type of communication service to be established with the second UE, or any combination thereof.

4. The apparatus of claim 1, wherein the instructions are further executable by the at least one processor to cause the apparatus to:
identify one or more assisting nodes which are within a range of the first UE; and
transmit, via the request, an indication of the one or more identified assisting nodes, wherein receiving the first control signaling is based at least in part on transmitting the indication of the one or more identified assisting nodes.

5. The apparatus of claim 4, wherein the instructions are further executable by the at least one processor to cause the apparatus to:
transmit, via the request, information associated with each assisting node of the one or more identified assisting nodes, wherein the information comprises a distance between the first UE and each respective assisting node, a signal strength metric associated with signals received from each respective assisting node, a signal quality metric associated with signals received from each respective assisting node, or any combination thereof, wherein receiving the first control signaling is based at least in part on the information associated with each assisting node.

6. The apparatus of claim 1, wherein the instructions are further executable by the at least one processor to cause the apparatus to:
receive, from the network entity, third control signaling comprising an indication of a plurality of transmission occasions associated with a periodicity, the plurality of transmission occasions configured for communicating requests for the network entity to establish wireless connections between wireless devices via assisting nodes, wherein the request is transmitted within a transmission occasion of the plurality of transmission occasions.

7. The apparatus of claim 1, wherein the instructions are further executable by the at least one processor to cause the apparatus to:
transmit the request to the network entity based at least in part on the first UE being unable to establish a sidelink communication link with the second UE.

8. The apparatus of claim 1, wherein the instructions are further executable by the at least one processor to cause the apparatus to:
receive, via the first control signaling, an indication of an additional set of resources for performing the directional learning procedure with the assisting node; and
perform directional learning communications with the assisting node within the additional set of resources using the subset of beam pair links to perform the directional learning procedure, wherein transmitting the uplink message is based at least in part on the performance of the directional learning communications.

9. The apparatus of claim 1, wherein the instructions are further executable by the at least one processor to cause the apparatus to:
receive, via the first control signaling, an indication of a position of the assisting node, a direction of the assisting node relative to the first UE, or both, wherein the information associated with the subset of beam pair links comprises the position, the direction, or both; and
perform directional learning communications with the assisting node based at least in part on the position, the direction, or both, wherein transmitting the uplink message is based at least in part on the performance of the directional learning communications.

10. The apparatus of claim 1, wherein the instructions are further executable by the at least one processor to cause the apparatus to:
transmit, via the uplink message, a measurement report associated with wireless communications between the first UE and the assisting node, a quasi co-location associated with the assisting node, or both, wherein receiving the second control signaling is based at least in part on the measurement report, the quasi co-location, or both.

11. The apparatus of claim 1, wherein the set of candidate link configurations comprise a set of candidate reflective parameters associated with the assisting node, wherein communicating with the second UE via the one or more assisting devices of the assisting node comprises communicating in accordance with a subset of reflective parameters of the set of candidate reflective parameters of the assisting node.

12. The apparatus of claim 1, wherein the instructions are further executable by the at least one processor to cause the apparatus to:
identify the at least one beam pair link of the subset of beam pair links based at least in part on performing the directional learning procedure, wherein the uplink message comprises an indication of the at least one beam pair link, wherein the set of candidate link configurations is based at least in part on the indication of the at least one beam pair link.

13. An apparatus for wireless communication at a network entity, comprising:
at least one processor;
memory coupled with the at least one processor; and
instructions stored in the memory and executable by the at least one processor to cause the apparatus to:
receive, from a first user equipment (UE), a request for the network entity to establish a wireless communication link between the first UE and a second UE via at least one assisting device associated with at least one assisting node;
transmit, to the first UE in response to the request, first control signaling comprising an indication for the first UE to perform a directional learning procedure with the second UE via an assisting node associated with a plurality of beam pair links, wherein the first control signaling comprises information associated with a subset of beam pair links from the plurality of beam pair links that are to be used for the directional learning procedure;

receive, from the first UE, the assisting node, or both, and based at least in part on the first control signaling, an uplink message comprising an indication of a completion of the directional learning procedure performed with the assisting node using the subset of beam pair links; and transmit, to the first UE, the assisting node, or both, and in response to the uplink message, second control signaling indicating a set of resources for performing a link configuration procedure between the first UE and the second UE, wherein the second control signaling indicates a set of candidate link configurations that are usable for communications via at least one beam pair link of the subset of beam pair links.

14. The apparatus of claim 13, wherein the instructions are further executable by the at least one processor to cause the apparatus to:

receive, from the first UE, an additional assisting node, or both, and based at least in part on transmitting the first control signaling, an additional uplink message comprising an indication of a completion of an additional directional learning procedure performed between the first UE and the additional assisting node; and select the assisting node for establishing the wireless communication link between the first UE and the second UE based at least in part on a comparison of the uplink message and the additional uplink message, wherein transmitting the second control signaling is based at least in part on the selecting.

15. The apparatus of claim 13, wherein the instructions are further executable by the at least one processor to cause the apparatus to:

receive, via the request, an indication of one or more parameters associated with the second UE, wherein transmitting the first control signaling is based at least in part on the indication of the one or more parameters.

16. The apparatus of claim 15, wherein the one or more parameters comprise a destination identifier associated with the second UE, a peer layer 2 identifier associated with the second UE, a geographical location of the second UE, a sidelink zone identifier associated with the second UE, a cell identifier associated with the second UE, a type of communication service to be established with the second UE, or any combination thereof.

17. The apparatus of claim 13, wherein the instructions are further executable by the at least one processor to cause the apparatus to:

receive, via the request, an indication of one or more assisting nodes which are within a range of the first UE, wherein transmitting the first control signaling is based at least in part on receiving the indication of the one or more assisting nodes.

18. The apparatus of claim 17, wherein the instructions are further executable by the at least one processor to cause the apparatus to:

receive, via the request, information associated with each assisting node of the one or more assisting nodes, wherein the information comprises a distance between the first UE and each respective assisting node, a signal strength metric associated with signals received from each respective assisting node, a signal quality metric associated with signals received from each respective assisting node, or any combination thereof, wherein transmitting the first control signaling is based at least in part on the information associated with each assisting node.

19. The apparatus of claim 13, wherein the instructions are further executable by the at least one processor to cause the apparatus to:

transmit, to the first UE, third control signaling comprising an indication of a plurality of transmission occasions associated with a periodicity, the plurality of transmission occasions configured for communicating requests for the network entity to establish wireless connections between wireless devices via assisting nodes, wherein the request is received within a transmission occasion of the plurality of transmission occasions.

20. The apparatus of claim 13, wherein the instructions are further executable by the at least one processor to cause the apparatus to:

receive the request from the first UE based at least in part on the first UE being unable to establish a sidelink communication link with the second UE.

21. The apparatus of claim 13, wherein the instructions are further executable by the at least one processor to cause the apparatus to:

transmit, via the first control signaling, an indication of an additional set of resources for performing the directional learning procedure with the assisting node, wherein receiving the uplink message is based at least in part on the indication of the additional set of resources.

22. The apparatus of claim 13, wherein the instructions are further executable by the at least one processor to cause the apparatus to:

transmit, via the first control signaling, an indication of a position of the assisting node, a direction of the assisting node relative to the first UE, or both, wherein the information associated with the subset of beam pair links comprises the position, the direction, or both, wherein receiving the uplink message is based at least in part on the indication of the position, the direction, or both.

23. The apparatus of claim 13, wherein the instructions are further executable by the at least one processor to cause the apparatus to:

receive, via the uplink message, a measurement report associated with wireless communications between the first UE and the assisting node, a quasi co-location associated with the assisting node, or both, wherein transmitting the second control signaling is based at least in part on the measurement report, the quasi co-location, or both.

24. An apparatus for wireless communication at an assisting node, comprising:

at least one processor;
memory coupled with the at least one processor; and
instructions stored in the memory and executable by the at least one processor to cause the apparatus to:

receive, from a network entity, first control signaling comprising an indication for the assisting node to perform a directional learning procedure with a first UE and a second UE using a plurality of beam pair links of the assisting node, wherein the first control signaling comprises information associated with a subset of beam pair links from the plurality of beam pair links that are to be used for the directional learning procedure;

transmit, to the network entity and based at least in part on the first control signaling, an uplink message comprising an indication of a completion of the directional learning procedure performed with the first UE using the subset of beam pair links;

receive, from the network entity in response to the uplink message, second control signaling indicating a set of resources for performing a link configuration procedure between the first UE and a second UE, wherein the second control signaling indicates a set of candidate link configurations that are usable for communications via at least one beam pair link of the subset of beam pair links; and communicate, based at least in part on the first control signaling and the second control signaling and via one or more assisting devices of the assisting node, with the first UE and the second UE using a link configuration of the set of candidate link configurations and via the at least one beam pair link of the subset of beam pair links.

25. The apparatus of claim 24, wherein the instructions are further executable by the at least one processor to cause the apparatus to:

receive, via the first control signaling, an indication of an additional set of resources for performing the directional learning procedure with the first UE; and perform directional learning communications with the first UE within the additional set of resources using the subset of beam pair links of the assisting node to perform the directional learning procedure, wherein transmitting the uplink message is based at least in part on the performance of the directional learning communications.

26. The apparatus of claim 24, wherein the instructions are further executable by the at least one processor to cause the apparatus to:

receive, via the first control signaling, an indication of a position of the first UE, a direction of the first UE relative to the assisting node, or both, wherein the information associated with the subset of beam pair links comprises the position, the direction, or both; and perform directional learning communications with the first UE based at least in part on the position, the direction, or both, wherein transmitting the uplink message is based at least in part on the performance of the directional learning communications.

27. The apparatus of claim 24, wherein the instructions are further executable by the at least one processor to cause the apparatus to:

transmit, via the uplink message, a measurement report associated with wireless communications between the first UE and the assisting node, a quasi co-location associated with the assisting node, or both, wherein receiving the second control signaling is based at least in part on the measurement report, the quasi co-location, or both.

28. The apparatus of claim 24, wherein the set of candidate link configurations comprise a set of candidate reflective parameters associated with the assisting node, wherein communicating with the first UE and the second UE comprises communicating in accordance with a subset of reflective parameters of the set of candidate reflective parameters of the assisting node.

29. The apparatus of claim 24, wherein the instructions are further executable by the at least one processor to cause the apparatus to:

identify the at least one beam pair link of the subset of beam pair links based at least in part on performing the directional learning procedure, wherein the uplink message comprises an indication of the at least one beam pair link, wherein the set of candidate link configurations is based at least in part on the indication of the at least one beam pair link.

30. A method for wireless communication at a first user equipment (UE), comprising:

transmitting, to a network entity, a request for the network entity to establish a wireless communication link between the first UE and a second UE via at least one assisting device associated with at least one assisting node;

receiving, from the network entity in response to the request, first control signaling comprising an indication for the first UE to perform a directional learning procedure with the second UE via an assisting node associated with a plurality of beam pair links, wherein the first control signaling comprises information associated with a subset of beam pair links from the plurality of beam pair links that are to be used for the directional learning procedure;

transmitting, to the network entity and based at least in part on the first control signaling, an uplink message comprising an indication of a completion of the directional learning procedure performed with the assisting node using the subset of beam pair links;

receiving, from the network entity in response to the uplink message, second control signaling indicating a set of resources for performing a link configuration procedure between the first UE and the second UE, wherein the second control signaling indicates a set of candidate link configurations that are usable for communications via at least one beam pair link of the subset of beam pair links; and communicating, based at least in part on the first control signaling and the second control signaling, with the second UE via one or more assisting devices of the assisting node using a link configuration of the set of candidate link configurations and via the at least one beam pair link of the subset of beam pair links.

* * * * *